US011570602B2

(12) United States Patent
Park et al.

(10) Patent No.: US 11,570,602 B2
(45) Date of Patent: Jan. 31, 2023

(54) METHOD FOR COMMUNICATING WITH EXTERNAL ELECTRONIC APPARATUS AND ELECTRONIC APPARATUS THEREOF

(71) Applicant: Samsung Electronics Co., Ltd., Gyeonggi-do (KR)

(72) Inventors: Chanyeol Park, Gyeonggi-do (KR); Seungseok Kang, Gyeonggi-do (KR); Wonsik Song, Gyeonggi-do (KR); Jungmin Cho, Gyeonggi-do (KR); Chunho Park, Gyeonggi-do (KR); Wonick Ahn, Gyeonggi-do (KR); Hojun Jaygarl, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 18 days.

(21) Appl. No.: 17/079,749

(22) Filed: Oct. 26, 2020

(65) Prior Publication Data

US 2021/0127245 A1 Apr. 29, 2021

(30) Foreign Application Priority Data

Oct. 25, 2019 (KR) .................. 10-2019-0133855
Feb. 10, 2020 (KR) .................. 10-2020-0015532

(51) Int. Cl.
*H04W 4/80* (2018.01)
*H04W 76/14* (2018.01)
(Continued)

(52) U.S. Cl.
CPC ............ *H04W 4/80* (2018.02); *H04W 12/03* (2021.01); *H04W 12/069* (2021.01); *H04W 12/50* (2021.01); *H04W 76/14* (2018.02)

(58) Field of Classification Search
CPC ... H04W 76/14; H04W 12/50; H04W 12/069; H04W 12/03
See application file for complete search history.

(56) References Cited

U.S. PATENT DOCUMENTS 7,356,329 B2  4/2008  Willey et al.
7,787,865 B2  8/2010  Willey et al.
(Continued)

FOREIGN PATENT DOCUMENTS

KR  10-2007-0090454 A  9/2007
WO  2017/205770 A1  11/2017

OTHER PUBLICATIONS

International Search Report dated Jan. 29, 2021.
Extended European Search Report dated Oct. 7, 2022.

*Primary Examiner* — Ernest G Tacsik
(74) *Attorney, Agent, or Firm* — Cha & Reiter, LLC

(57) ABSTRACT

An electronic device and method are disclosed herein. The electronic device includes memory storing a certificate list including first certificate data of the electronic device, and second certificate data of an external electronic device, a short-range wireless communication circuit, and a processor. The processor implements the method, including: detecting a trigger event for requesting establishment a communication connection with a device local to the electronic device, controlling the short-range wireless communication circuit to broadcast an advertisement packet generated based on the first certificate data, in response to detecting the trigger event, receiving a response packet from the external electronic device and acquire a third certificate data from the received response packet, authenticating the external electronic device based on the second certificate data and the third certificate data, and establishing a secure communication channel with the external electronic device if the external electronic device is authenticated.

19 Claims, 21 Drawing Sheets

(51) Int. Cl.
*H04W 12/03* (2021.01)
*H04W 12/50* (2021.01)
*H04W 12/069* (2021.01)

(56) References Cited

U.S. PATENT DOCUMENTS

| | | |
|---|---|---|
| 7,848,746 B2 | 12/2010 | Juels |
| 3,045,961 A1 | 10/2011 | Ayed et al. |
| 8,112,066 B2 | 2/2012 | Ben Ayed |
| 8,275,365 B1 | 9/2012 | Patvarczski et al. |
| 8,495,372 B2 | 7/2013 | Bailey et al. |
| 8,600,360 B1 | 12/2013 | Patvarczski et al. |
| 8,914,000 B2 | 12/2014 | Patvarczski et al. |
| 9,264,426 B2 | 2/2016 | Buer et al. |
| 9,380,123 B2 | 6/2016 | Linn et al. |
| 9,451,438 B2 | 9/2016 | Conn et al. |
| 9,544,714 B2 | 1/2017 | Krochmal et al. |
| 9,614,845 B2 | 4/2017 | Rolfe |
| 10,055,567 B2 | 8/2018 | Ulrich et al. |
| 10,057,700 B2 | 8/2018 | Proctor, Jr. et al. |
| 10,204,357 B2 | 2/2019 | Proctor, Jr. et al. |
| 10,397,780 B2 | 8/2019 | Rolfe |
| 10,546,113 B2 | 1/2020 | Ulrich et al. |
| 11,223,948 B2 | 1/2022 | Rolfe |
| 2005/0191990 A1 | 9/2005 | Willey et al. |
| 2006/0003739 A1* | 1/2006 | Sasakura ............ G08B 21/0213 455/411 |
| 2006/0136717 A1 | 6/2006 | Buer et al. |
| 2007/0186105 A1 | 8/2007 | Bailey et al. |
| 2007/0279227 A1 | 12/2007 | Juels |
| 2008/0065892 A1 | 3/2008 | Bailey et al. |
| 2008/0307068 A1 | 12/2008 | Willey et al. |
| 2010/0061294 A1 | 3/2010 | Proctor, Jr. et al. |
| 2011/0215921 A1 | 9/2011 | Ben Ayed et al. |
| 2011/0293095 A1 | 12/2011 | Ben Ayed |
| 2011/0300802 A1 | 12/2011 | Proctor, Jr. et al. |
| 2011/0313922 A1 | 12/2011 | Ben Ayed |
| 2012/0030461 A1 | 2/2012 | Willey et al. |
| 2013/0013925 A1 | 1/2013 | Buer et al. |
| 2014/0089412 A1 | 3/2014 | Patvarczski et al. |
| 2015/0011160 A1* | 1/2015 | Jurgovan ............ H04B 5/0031 455/41.1 |
| 2015/0347738 A1 | 12/2015 | Ulrich et al. |
| 2015/0350865 A1 | 12/2015 | Conn et al. |
| 2016/0278006 A1 | 9/2016 | Lee et al. |
| 2016/0308862 A1 | 10/2016 | Rolfe |
| 2017/0251344 A1 | 8/2017 | Patvarczski et al. |
| 2018/0183596 A1 | 6/2018 | Deshpande et al. |
| 2019/0159005 A1 | 5/2019 | Linn et al. |
| 2019/0166212 A1 | 5/2019 | Linn et al. |
| 2019/0373469 A1* | 12/2019 | Bradley ............ H04W 12/0433 |
| 2020/0304978 A1 | 9/2020 | Proctor et al. |
| 2021/0117566 A1* | 4/2021 | Kajava ................ H04L 9/3234 |

* cited by examiner

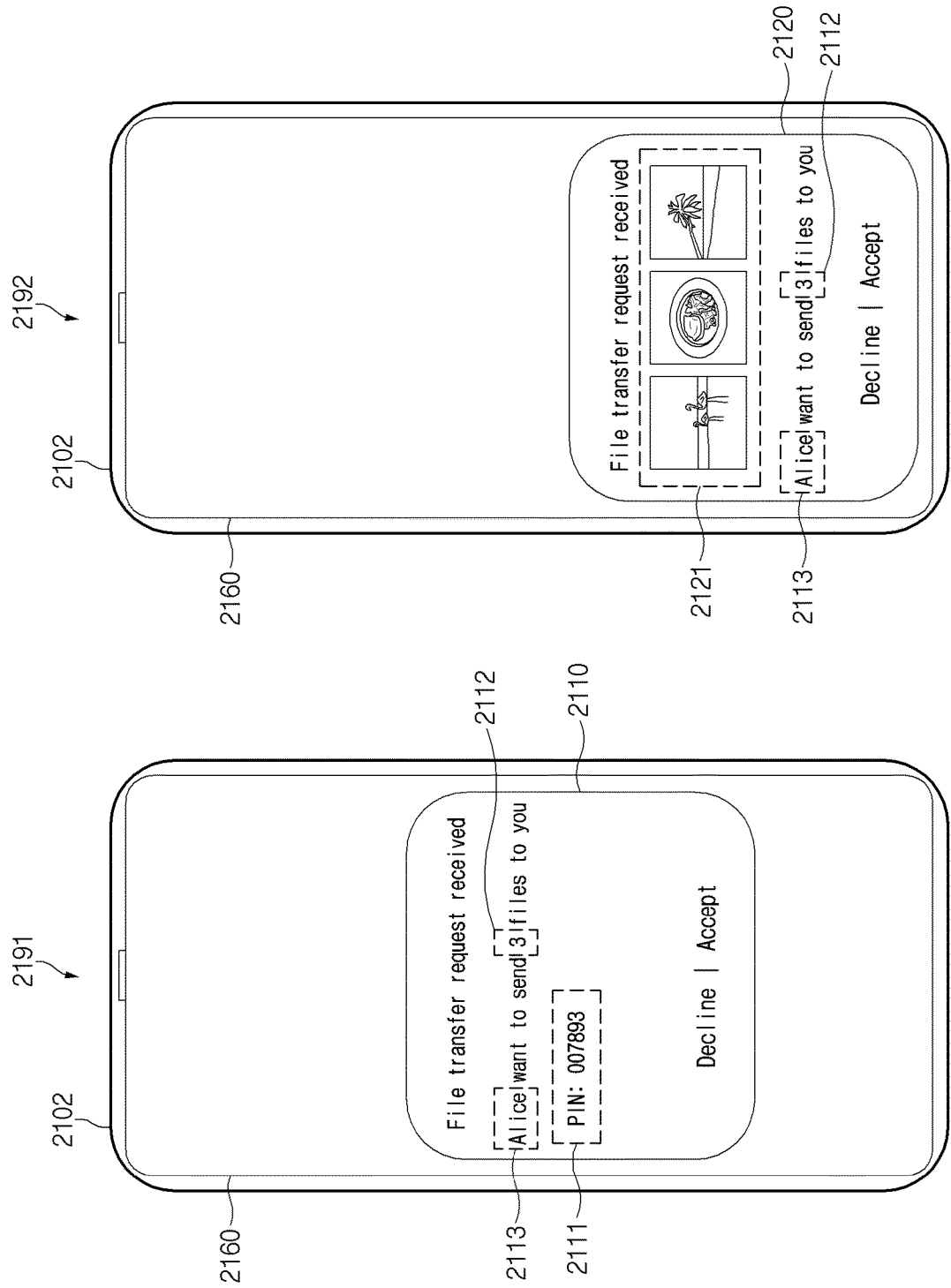

METHOD FOR COMMUNICATING WITH EXTERNAL ELECTRONIC APPARATUS AND ELECTRONIC APPARATUS THEREOF

CROSS-REFERENCE TO RELATED APPLICATION(S)

This application claims the benefit under 35 U.S.C. § 119(a) of Korean patent applications filed on Oct. 25, 2019 and Feb. 10, 2020 in the Korean Intellectual Property Office and assigned Serial numbers 10-2019-0133855 and 10-2020-0015532, the entire disclosures of which are hereby incorporated by reference.

TECHNICAL FIELD

Embodiments disclosed in the present disclosure relate to networked intercommunication between electronic devices, and, more particularly, to certificate-based sharing of data between electronic devices over short-range communication.

BACKGROUND

With the development and proliferation of consumer electronic devices, there has been an increase in connectivity and content sharing between user devices. Short-range wireless communication is commonly used to enable communication between devices located within a shared locale. Short-range wireless communication methods include sharing through common access points, and direct peer-to-peer pairing of devices with one another. Examples of direct pairing-based communication through a local wireless-fidelity (WiFi) circuitry include an "ad-hoc" method, usage of a mobile access point, and WiFi direct.

SUMMARY

Short-range wireless communication method present a disadvantage in data transmission, in that a user manually configures the settings for short-range wireless communication. Therefore, it may be difficult for a user who is inexperienced and/or unfamiliar with wireless communication to pair devices.

When a user attempts to provide content of his or her electronic device to another external electronic device, it may therefore be difficult for the user to specify the external electronic device from which content is to be provided.

An aspect of the present disclosure is to provide an electronic device including a memory storing a certificate list including first certificate data of the electronic device and second certificate data of an external electronic device, a short-range wireless communication circuit, and a processor operatively connected to the memory and the short-range wireless communication circuit, wherein the memory may store instructions that, when executed, cause the processor to detect a trigger event for requesting establishment a communication connection with a device local to the electronic device, control the short-range wireless communication circuit to broadcast an advertisement packet generated based on the first certificate data, in response to detection of the trigger event, receive a response packet from the external electronic device and acquire a third certificate data from the received response packet, authenticate the external electronic device based on the second certificate data and the third certificate data, and establish a secure communication channel with the external electronic device if the external electronic device is authenticated.

Another aspect of the present disclosure is to provide an electronic device including a memory configured to store first certificate data of the electronic device, and second certificate data corresponding to a first user identification information, a short-range wireless communication circuit, and a processor operatively connected to the memory and the short-range wireless communication circuit, wherein the memory may store instructions that, when executed, cause the processor to receive an advertisement packet including third certificate data through the short-range wireless communication circuit, compare the third certificate data with the second certificate data in response to receiving the advertisement packet, transmit a response packet generated based on the first certificate data to an external electronic device through the short-range wireless communication circuit, based on detecting that the third certificate data matches the second certificate data, and receive a response to the transmitted response packet through the short-range wireless communication circuit and establish a secure communication channel with the external electronic device based on the received response.

Another aspect of the present disclosure is to provide an electronic device including a memory configured to store first certificate data of the electronic device and second certificate data of an external electronic device, a short-range wireless communication circuit, a long-range wireless communication circuit, and a processor operatively connected to the memory, the short-range wireless communication circuit, and the long-range communication circuit, wherein the memory may store instructions that, when executed, cause the processor to log in to an external server using a user account through the long-range wireless communication circuit, receive an account key value corresponding to the user account from the external server through the long-range wireless communication circuit, detect a trigger event for requesting establishment of a communication connection with a device local to the electronic device, control the short-range wireless communication circuit to broadcast a message including the received account key value, in response to detecting the trigger event, wherein an external electronic device determines possession of a key value matching the account key value, based on the message, transmit the first certificate data to the external electronic device through the short-range wireless communication circuit, receive third certificate data from the external electronic device through the short-range wireless communication circuit, and authenticate the external electronic device based on the second certificate data and the third certificate data.

Another aspect of the present disclosure is to provide an electronic device including a memory configured to store first certificate data of the electronic device and second certificate data of an external electronic device, a short-range wireless communication circuit, a long-range wireless communication circuit, and a processor operatively connected to the memory, the short-range wireless communication circuit, and the long-range communication circuit, wherein the memory may store instructions that, when executed, cause the processor to log in to an external server using a user account through the long-range wireless communication circuit, receive an account key value corresponding to the user account from the external server through the long-range wireless communication circuit, receive a message including the account key value through the short-range wireless communication circuit, identify that the external electronic device has a key value matching the account key value based on the received message, receive third certificate data from the external electronic device through the short-range wireless communication circuit, authenticate the external electronic device based on the second certificate data and the third certificate data, and transmit the first certificate data to the external electronic device through the short-range wireless communication circuit, based on detecting that authentication of the external electronic device is completed.

Another aspect of the present disclosure is to provide a method for communicating with an external electronic device by an electronic device, and the method may include storing, in a memory, first certificate data of the electronic device, and second certificate data of an external electronic device, detecting a trigger event requesting establishment of a communication connection with another device local to the electronic device, broadcasting an advertisement packet generated based on the first certificate data, in response to detection of the trigger event, acquiring third certificate data from a response packet received responsive to the broadcast advertisement packet, based on detecting that the response packet is received from the external electronic device, authenticating the external electronic device based on the second certificate data and the third certificate data, and establishing a secure communication channel with the external electronic device based on detecting that the external electronic device is authenticated.

Another aspect of the present disclosure is to provide a method for communicating with an external electronic device by an electronic device, and the method may include storing first certificate data of the electronic device and second certificate data of the external electronic device, in response to receiving an advertisement packet including third certificate data, comparing the third certificate data with the second certificate; transmitting a response packet generated based on the first certificate data to an external electronic device, based on detecting a match between the third certificate data and the second certificate data, and receiving a response from the external electronic device based on the transmitted response packet, and establishing a secure communication channel with the external electronic device based on the response.

Another aspect of the present disclosure is to provide a method for communicating with an external electronic device by an electronic device, and the method may include storing first certificate data of the electronic device and second certificate data of the external electronic device, logging in to an external server using a user account, receiving an account key value corresponding to the user account from the external server, in response to detecting a trigger event requesting establishment of a communication connection with another device local to the electronic device, broadcasting a message including the account key value, receiving a response from the external electronic device to the message, and identifying that the external electronic device has a key value matching the account key value based on the response, transmitting the first certificate data to the external electronic device, receiving third certificate data from the external electronic device, and authenticating the external electronic device based on the second certificate data and the third certificate data.

Another aspect of the present disclosure is to provide a method for communicating with an external electronic device by an electronic device, and the method may include storing first certificate data of the electronic device and second certificate data of the external electronic device, logging in to an external server using a user account, receiving an account key value corresponding to the user account from the external server, receiving a message including the account key value through the short-range wireless communication circuit, identifying, based on the message, that the external electronic device has a key value matching the account key value, receiving third certificate data from the external electronic device, authenticating the external electronic device based on the second certificate data and the third certificate data, and transmitting the first certificate data to the external electronic device, if authentication of the external electronic device is completed.

BRIEF DESCRIPTION OF THE DRAWINGS

FIG. 21 illustrates a connection request UI in an external electronic device.

With respect to the description of the drawings, the same or similar reference signs may be used for the same or similar elements.

DETAILED DESCRIPTION

Hereinafter, certain embodiments disclosed in the present disclosure will be described with reference to the accompanying drawings. However, this is not intended to limit the present disclosure to the specific embodiments, and it is to be construed to include various modifications, equivalents, and/or alternatives of embodiments of the present disclosure.

Figure 1:
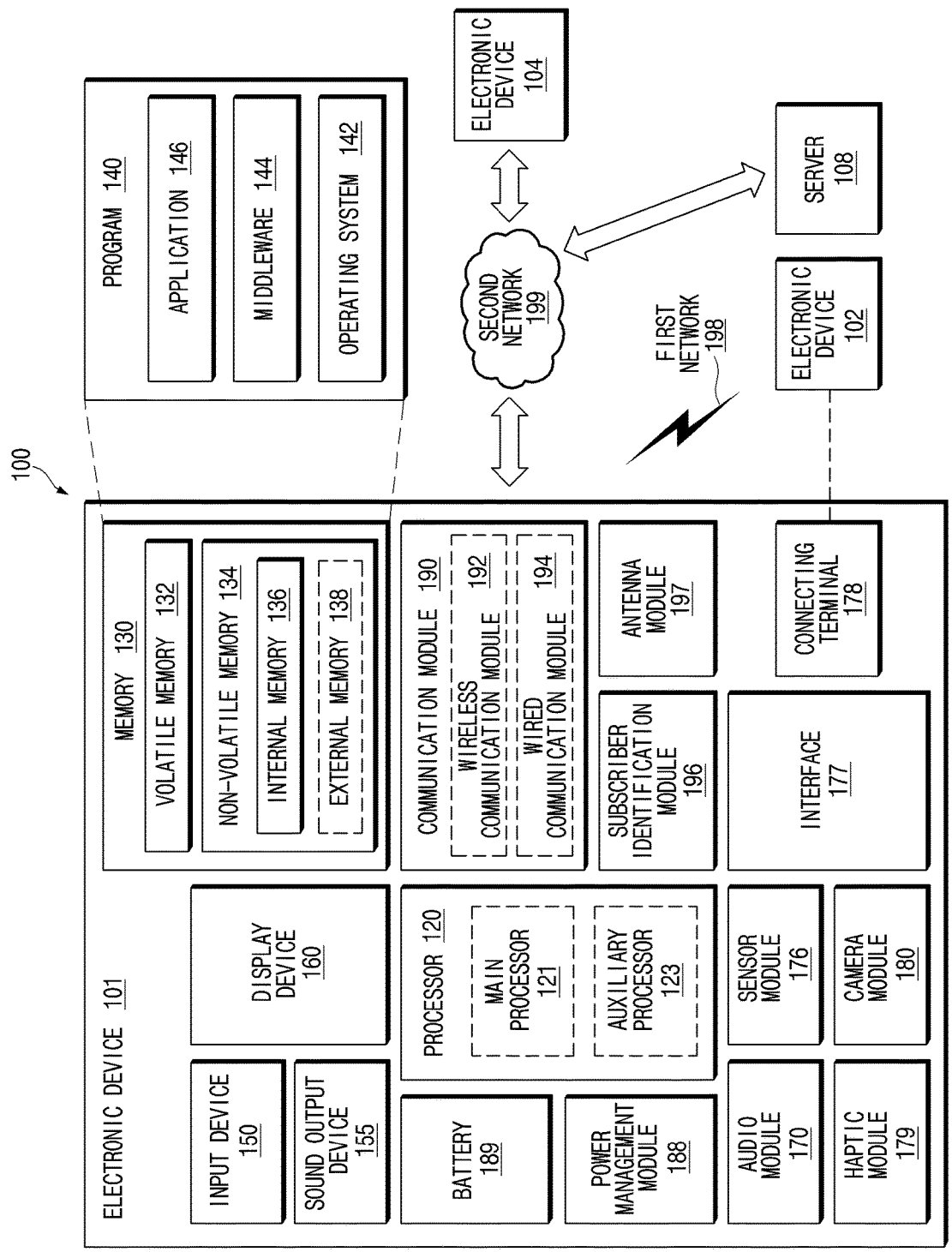
FIG. 1 illustrates an electronic device in a network environment according to certain embodiments of the present disclosure.

FIG. 1 is a block diagram illustrating an electronic device 101 in a network environment 100 according to certain embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element implemented using a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
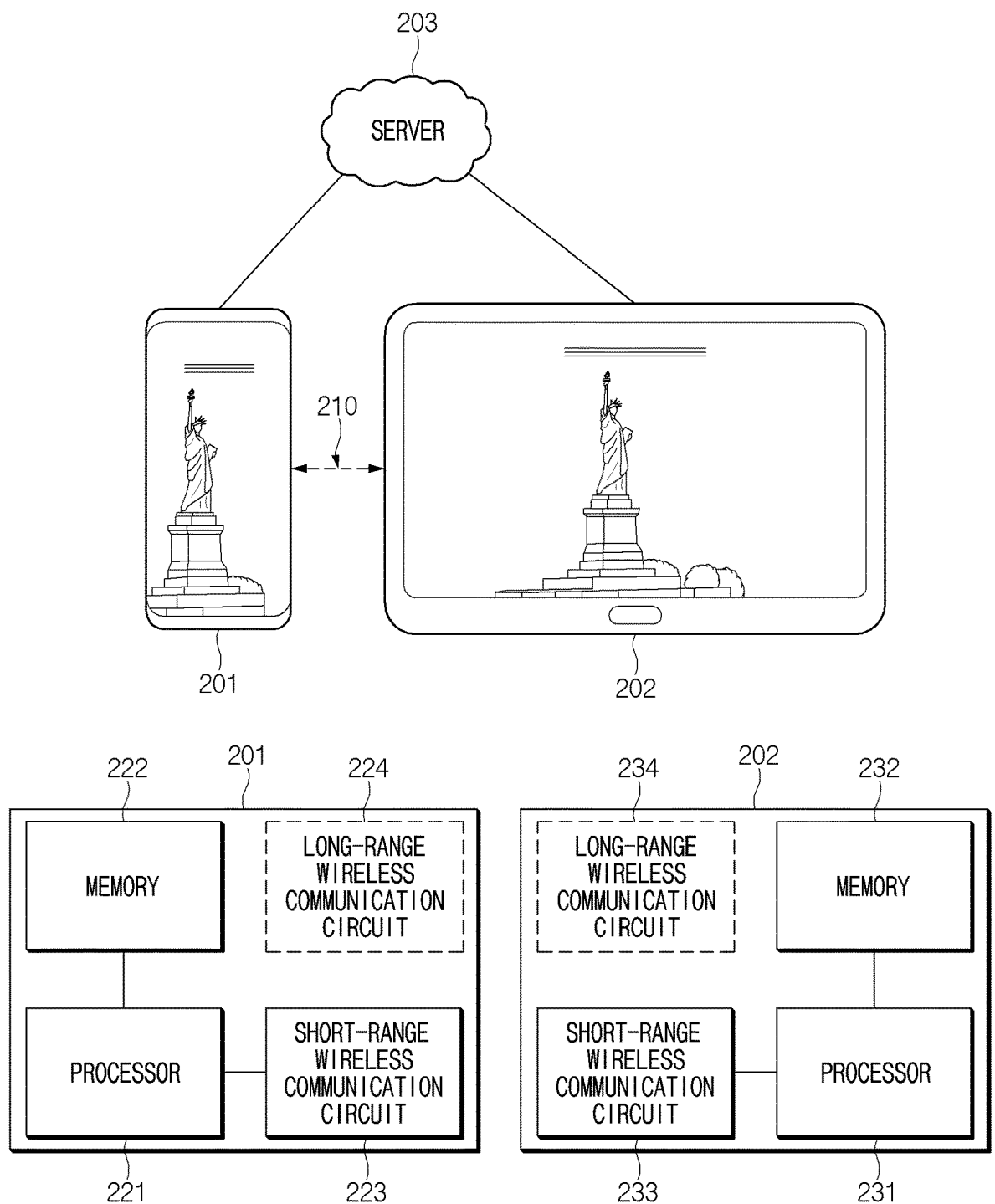
FIG. 2 illustrates a device-to-device connecting structure in which an electronic device establishes communication connection with an external electronic device, according to an embodiment.

FIG. 2 illustrates a device-to-device connecting structure in which an electronic device 201 according to an embodiment (e.g., the electronic device 101 of FIG. 1) establishes communication connection with an external electronic device 202 (e.g., the electronic device 102 and the electronic device 104 of FIG. 1).

The electronic device 201 according to an embodiment may include a processor 221, a memory 222, and a short-range wireless communication circuit 223. According to another embodiment, the electronic device 201 may further include a long-range wireless communication circuit 224 configured to communicate with the server 203. In this case, the short-range wireless communication circuit 223 and the long-range wireless communication circuit 224 may be configured as separate chips or modules, or may be formed as one chip or module. According to an embodiment, the electronic device 201 may communicate with the server 203 through a long-range wireless communication protocol (e.g., a protocol supporting the second network 199 of FIG. 1). The processor 221 may perform control to operate the electronic device 201 by executing instructions stored in the memory 222.

The external electronic device 202 according to an embodiment may include a processor 231, a memory 232, and a short-range wireless communication circuit 233. According to another embodiment, the external electronic device 202 may further include a long-range wireless communication circuit 234 configured to communicate with the server 203. In this case, the short-range wireless communication circuit 233 and the long-range wireless communication circuit 234 may be separate chips or modules, or may be formed as one chip or module (e.g., the wireless communication module 192 of FIG. 1). According to an embodiment, the external electronic device 202 may communicate with the server 203 through a long-range wireless communication protocol (e.g., a protocol supporting the second network 199 of FIG. 1). The processor 231 may perform control to operate the external electronic device 202 by executing instructions stored in the memory 232.

According to an embodiment, in order to share content, the electronic device 201 may establish a communication connection 210 for transmitting and receiving data with the external electronic device 202. The communication connection 210 may be, for example, a peer-to-peer (P2P) communication connection such as a WiFi ad-hoc method, a mobile access point, and a WiFi direct. Content may be data stored in the memory 222 or data output by the electronic device 201 (e.g., the display device 160 or the sound output device 155 of FIG. 1). For example, the content may include multimedia data or text data stored in the memory 222. Alternatively, the content may include at least a part of a page or a link address displayed on a display of the electronic device through a browser.

In order to establish the communication connection 210 with the external electronic device 202, the electronic device 201 may activate a communication module (e.g., the communication module 190 of FIG. 1) of the electronic device 201 and attempt recognition of nearby devices, including the external electronic device 202. In order to select the external electronic device 202 from among recognized nearby devices, the electronic device 201 may display a list of nearby devices, and receive a user input selecting an item corresponding to the external electronic device 202 from the list. The electronic device 201 may display a list of nearby devices to indicate information such as model names of nearby devices; however, it is difficult for the user to know which device is the device to which the user wants to connect from the model name alone.

In addition, if the electronic device 201 automatically connects with the external electronic device 202, contrary to the user's intention, there is a danger that a communication connection with an untrusted device will be established, and data may be transmitted.

Therefore, according to an embodiment of the present disclosure, the processor 221 may register, in the server 203, public certificate data (hereinafter, may be referred to as "first certificate data") including information that is capable of uniquely identifying the electronic device 201. In addition, the processor 231 of the external electronic device 202 according to an embodiment may also register, in the server 203, public certificate data (hereinafter, may be referred to as "second certificate data") including information that is capable of uniquely identifying the external electronic device 202. For example, the first certificate data may include at least a part of a key pair generated by the electronic device 201 (e.g., a public key). The second certificate data may include at least a part of a key pair generated by the external electronic device 202 (e.g., a public key).

In addition, the electronic device 201 according to an embodiment of the present disclosure may download a certificate list including public certificate data of trusted devices from the server 203. According to another embodiment, the electronic device 201 may not directly receive the certificate list, but may use the certificate list stored in the server 203 using cloud computing. The electronic device 201 may exchange public certificate data with the external electronic device 202 located nearby, and may perform mutual authentication using the public certificate data.

According to an embodiment of the present disclosure, the electronic device 201 and the external electronic device 202 may register public certificate data in association with a user account logged in to the server 203. The server 203 may accept a device logged in to the server 203 based on the user account to access the public certificate data registered in association with the user account. Accordingly, if the electronic device 201 of the user logs in to the server 203 with the user account, the processor 221 may allow the electronic device 201 to access the public certificate data of devices which the user has registered in his or her device or to download the public certificate data.

According to an embodiment of the present disclosure, the electronic device 201 and the external electronic device 202 may be devices logged in to the server with the same user account. If a trigger event occurs, the processor 221 may establish the communication connection 210 for sharing content with the external electronic device 202. That is, the user may manipulate the electronic device 201 to share content between a plurality of devices owned by the user. For example, the electronic device 201 may receive a user input for selecting a button for sharing a photo file stored in the memory 222 with another device. For another example, the processor 221 may receive a "copy" or "paste to another device" command in a state in which at least some of the content displayed on the electronic device 201 is selected. The trigger event means that an instruction for establishing a communication connection through which the electronic device 201 transmits data to the external electronic device 202 or receives data from the external electronic device 202 is executed, and is not limited to those examples.

If the electronic device 201 and the external electronic device 202 log in to the server 203 with the user account, the electronic device 201 and the external electronic device 202 may receive the account key value corresponding to the user account from the server 203 through the long-range wireless communication circuit 224 or 234. The account key value may include a key value that the server 203 generates for the user account. Accordingly, a device logged in with the same user account may receive the same account key value from the server 203. For example, the electronic device 201 may store the account key value in a communication chip including the short-range wireless communication circuit 223. If user information on the user is registered in the server 203 with respect to the user account through the electronic device 201 or another device, the server 203 may generate an account key value based on the user information. For example, the server 203 may acquire an account key value by inputting the user information into a function for generating an account key value. The user information may include information capable of identifying the user. For example, the user information may include account credentials for the user account.

The processor 221 may control the short-range wireless communication circuit 223 to broadcast a message including an account key value of the electronic device 201. The short-range wireless communication circuit 223 may broadcast the message through a short-range wireless communication (e.g., Bluetooth™ Low Energy (BLE) protocol-based communication) signal. The processor 221 may modulate the account key by merging it with a random number, and may broadcast the modulated account key by including it in the message. For example, the processor 221 may modulate the message including the account key by using a bloom filter. The processor 231 of the external electronic device 202 may receive the message through the short-range wireless communication circuit 233. The processor 231 may control the external electronic device 202 to transmit the message including the account key value of the external electronic device 202 to the electronic device 201 in response to the broadcast message. The processor 221 of the electronic device 201 may recognize the external electronic device 202 having the same account key value based on the message received from the external electronic device 202. The electronic device 201 may exchange certificate data with the recognized external electronic device 202 through secure communication (e.g., secure communication through the communication module 190 of FIG. 1).

If the electronic device 201 transmits first certificate data of the electronic device 201 to the external electronic device 202, the processor 231 of the external electronic device 202 may verify whether the certificate list stored in the server 203 or received from the server 203 includes the first certificate data. If the certificate list includes the first certificate data, the processor 231 may control the external electronic device 202 to transmit second certificate data of the external electronic device 202 to the electronic device 201. The processor 221 of the electronic device 201 may authenticate the external electronic device 202 based on whether the certificate list stored in the server 203 or received from the server 203 includes the second certificate data. If the certificate list does not include the first certificate data, the external electronic device 202 may terminate the communication connection without transmitting the second certificate data to the electronic device 201. If the electronic device 201 and the external electronic device 202 authenticate each other using the certificate data, the processor 221 may control the electronic device 201 such that the electronic device 201 and the external electronic device 202 share a session key with each other and form an encrypted channel 210 based on the session key. The encrypted channel 210 may be configured as a communication connection method capable of transmitting and receiving data, such as an ad-hoc method, a mobile access point, and a WiFi direct.

According to another embodiment, the electronic device 201 and the external electronic device 202 may be devices that log in to the server 203 based on different user accounts. For example, the user may want to transmit content from his or her device to his or her friend's device located nearby or to receive content from the friend's device. According to an embodiment, the electronic device 201 may receive the certificate list including the second certificate data or may access the certificate list based on user identification information capable of identifying a correlation between the user of the electronic device 201 and a user of the external electronic device 202. For example, the user identification information may include identification information (for a more specific example, contact information such as a phone number, email address, or mail account, device-specific identification information such as international mobile equipment identity (IMEI), or service subscriber identification information such as a social media service account) of the external electronic device 202 stored in a contact storage of the electronic device 201 (e.g., a contact database configured on the memory 222). The user identification information does not have to be stored in the electronic device 201, but may be stored in a separate device.

The processor 221 may control the electronic device 201 to register the first certificate data of the electronic device 201 and user identification information of the electronic device 201 (hereinafter, may be referred to as "first user identification information") in the server 203. The electronic device 201 according to an embodiment may provide, to the server 203, a user identification information list (hereinafter, may be referred to as a "first user identification information list") including user identification information (hereinafter, may be referred to as "second user identification information") on the external electronic device 202 stored by the user of the electronic device 201. The user identification information stored by the user of the electronic device 201 and user identification information stored in the server 203 may be synchronized. That is, if the change to the user identification information stored by the user of the electronic device 201 occurs, the user identification information stored in the server 203 may also be changed according to the changed content. The external electronic device 202 may also register the second certificate data of the external electronic device and the second user identification information of the external electronic device 202 in the server 203. In addition, the external electronic device 202 may also provide, to the server 203, a user identification information list (hereinafter, may be referred to as a "second user identification information list") including first user identification information on the electronic device 201 stored by the user of the external electronic device 202.

The server 203 may generate a certificate list based on user identification information provided from the electronic device 201 and the external electronic device 202. According to an embodiment, if the first user identification information list includes the second user identification information and the second user identification information list includes the first user identification information, the server 203 may determine that users of the two devices are users who are able to trust each other. The server 203 may generate a certificate list (hereinafter may be referred to as a "first certificate list") including the second certificate data. The electronic device 201 may log in with a user account to access the first certificate list or download the first certificate list. In addition, the server 203 may generate a certificate list (hereinafter may be referred to as a "second certificate list") including the first certificate data. According to an embodiment, the certificate list may be provided in a form in which certificate data is added to a user identification information list (e.g., a contact list).

If the trigger event occurs, the processor 221 may control the short-range wireless communication circuit 223 to broadcast an advertisement packet in response to a detected trigger event, according to an embodiment. The advertisement packet may be generated based on the first certificate data. For example, the processor 221 may generate the advertisement packet to include data modulated by merging the first certificate data with the random number value. For another example, the processor 221 may acquire a hash value by inputting the first certificate data into a hash function, and may generate the advertisement packet to include the acquired hash value. According to another embodiment, the electronic device 201 may acquire a shared key shared with the external electronic device 202 and may generate the advertisement packet to include the encrypted first certificate data based on the shared key.

The processor 231 of the external electronic device 202 may receive the broadcast advertisement packet through the short-range wireless communication circuit 233. The processor 231 may acquire the first certificate data from the received advertisement packet. The processor 231 may authenticate the electronic device 201 based on whether the acquired first certificate data is included in the certificate list provided from the server 203. For example, if a hash value of the first certificate data is included in the advertisement packet, the first certificate data may be acquired from the hash value. For another example, the certificate list includes hash values of the certificate data, and the processor 231 may authenticate the electronic device 201 by comparing the hash values with each other.

If the authentication for the electronic device 201 is successfully completed, the external electronic device 202 may transmit a response packet including the second certificate data to the electronic device 201. If the electronic device 201 is not authenticated, the external electronic device 202 may not transmit the response packet. The processor 221 of the electronic device 201 may acquire the second certificate data from the received response packet. The processor 221 may authenticate the external electronic device 202 based on whether the acquired second certificate data is included in the first certificate list (that is, whether the certificate data received from the server 203 matches the certificate data acquired from the response packet). For example, if a hash value of the second certificate data is included in the response packet, the second certificate data may be acquired from the hash value. For another example, the certificate list may include hash values of the certificate data, and the processor 221 may authenticate the external electronic device 202 by comparing the hash values. If authentication of the external electronic device 202 is successfully completed, the processor 221 may control the electronic device 201 to form the secure communication channel (i.e., the encrypted channel 210) with the external electronic device 202.

Figure 3:
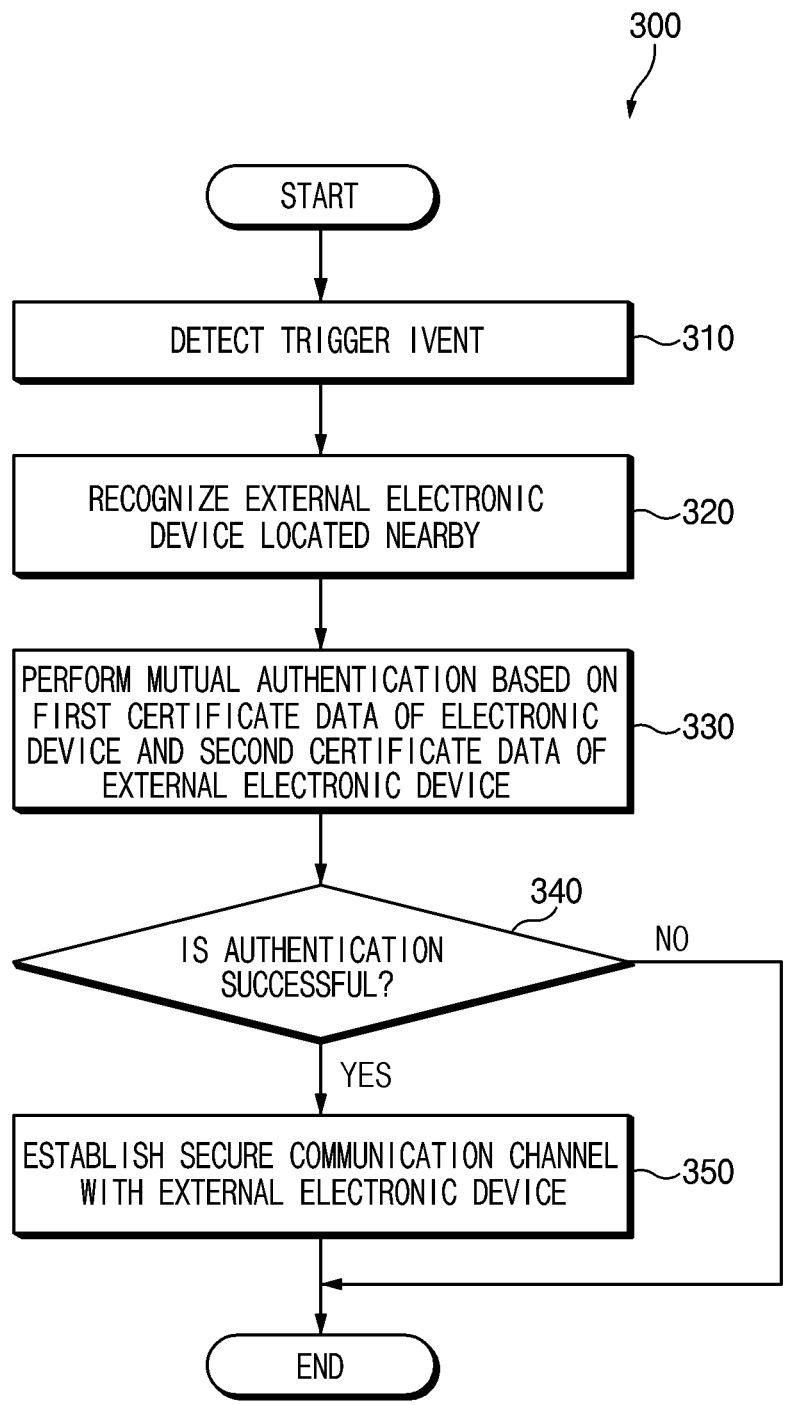
FIG. 3 is a flowchart illustrating a process in which an electronic device establishes communication connection with an external electronic device, according to an embodiment.

FIG. 3 is a flowchart 300 illustrating a process in which an electronic device (e.g., the electronic device 201 of FIG. 2) establishes a communication connection with an external electronic device (e.g., the external electronic device 202 of FIG. 2), according to an embodiment.

In operation 310, the electronic device may detect a trigger event. For example, if the electronic device captures an image using a camera (e.g., the camera module 180 of FIG. 1) and then selects the "Share to nearby trusted devices" menu item displayed on the electronic device, the electronic device may determine that a trigger event has occurred. For another example, if the electronic device receives a user input of selecting the "copy" item to save data on a clipboard, or receives a user input of selecting the "paste to another device" item while data is saved on the clipboard, the electronic device may determine that a trigger event has occurred.

In operation 320, the electronic device may recognize an external electronic device that is located nearby. For example, the electronic device may transmit (e.g., broadcast) the advertisement packet through a short-range wireless communication signal, and may receive the response packet from the external electronic device in response to the advertisement packet.

In operation 330, the electronic device may perform mutual authentication based on the first certificate data of the electronic device, and the second certificate data of the external electronic device. The electronic device and the external electronic device according to an embodiment may have public certificate data for a trusted device in advance. Alternatively, according to an embodiment, the electronic device and the external electronic device may access the certificate data stored in a server (e.g., the server 203 of FIG. 2) through the long-range wireless communication circuit to verify the received certificate data.

In operation 340, the electronic device may determine whether the external electronic device is successfully authenticated. If the external electronic device is successfully authenticated, the electronic device may establish a secure communication channel with the external electronic device in operation 350. When the trigger event is a command to transmit content data to the external electronic device, the electronic device may transmit data to the external electronic device through the established secure communication channel.

Figure 4:
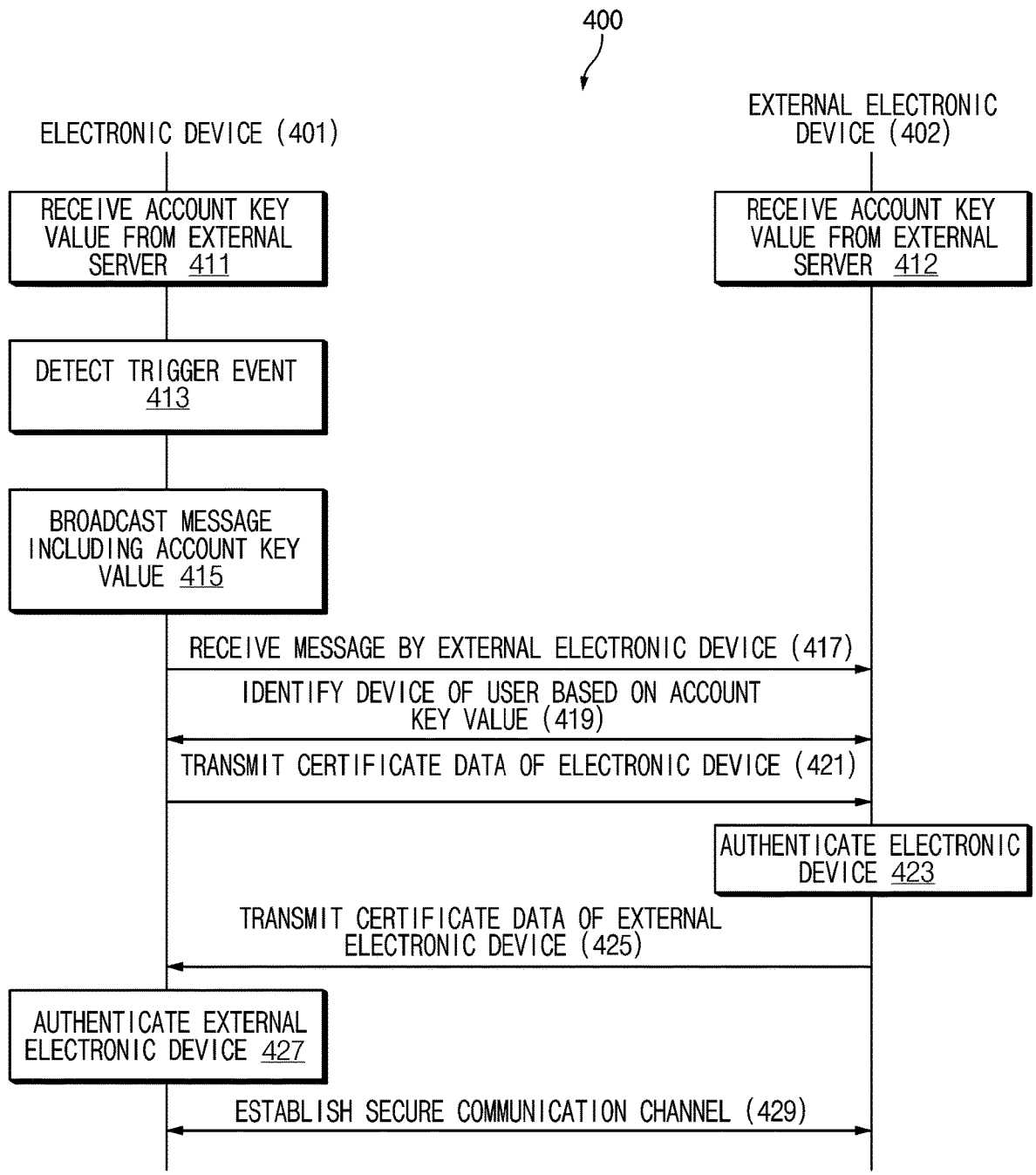
FIG. 4 is a flowchart illustrating a process in which an electronic device establishes communication connection with an external electronic device logged in with the same user account, according to an embodiment.

FIG. 4 is a flowchart 400 illustrating a process in which an electronic device 401 (e.g., the electronic device 201 of FIG. 2) establishes a communication connection with an external electronic device 402 (e.g., the external electronic device 202 of FIG. 2) logged in with the same user account, according to an embodiment.

In operation 411, the electronic device 401 may receive an account key value from an external server (e.g., the server 203 of FIG. 2) logged in through a long-range wireless communication protocol. Further, in operation 412, the external electronic device 402 may receive the same account key value from the external server through the long-range wireless communication protocol.

If a trigger event is detected in operation 413, the electronic device 401 may broadcast a message including the account key value through a short-range wireless communication (e.g., BLE communication) signal in operation 415. The external electronic device 402 may scan a short-range wireless communication signal periodically or for a specified period in order to receive a broadcast signal.

If the external electronic device 402 receives the broadcast message in operation 417, in operation 419, the electronic device 401 and the external electronic device 402 may recognize that the electronic device 401, which is the device of the user, and/or the external electronic device 402 is located within a short range (e.g., a threshold distance), based on the account key value. If the external electronic device 402 is recognized, the electronic device 401 may activate a processor (e.g., an application processor) of the electronic device 401 and may form an encrypted channel to exchange a certificate with the recognized external electronic device 402.

In operation 421, the electronic device 401 may transmit the first certificate data of the electronic device to the external electronic device 402 in order to attempt mutual authentication with the external electronic device 402. If the first certificate data is received, the external electronic device 402 may authenticate the electronic device 401 based on the first certificate data in operation 423. According to an embodiment, the external electronic device 402 may authenticate the electronic device 401 through a process identical or similar to operation 427.

If authentication for the electronic device 401 is successfully completed, in operation 425, the external electronic device 402 may transmit the second certificate data of the external electronic device 402 to the electronic device 401. In operation 427, the electronic device 401 may authenticate the external electronic device 402 based on the received second certificate data. In order to authenticate the external electronic device 402, the electronic device 401 according to an embodiment may determine that the external electronic device 402 is authenticated if a certificate list including a certificate list of at least one device registered as a trusted device in the user account includes the second certificate data. The electronic device 401 according to an embodiment may acquire the certificate list for authenticating the external electronic device 402 from the external server. If authentication of the external electronic device 402 is successfully completed in operation 427, in operation 429, the electronic device 401 may share a session key with the external electronic device 402 and may establish a secure communication channel for communicating based on the session key.

Figure 5:
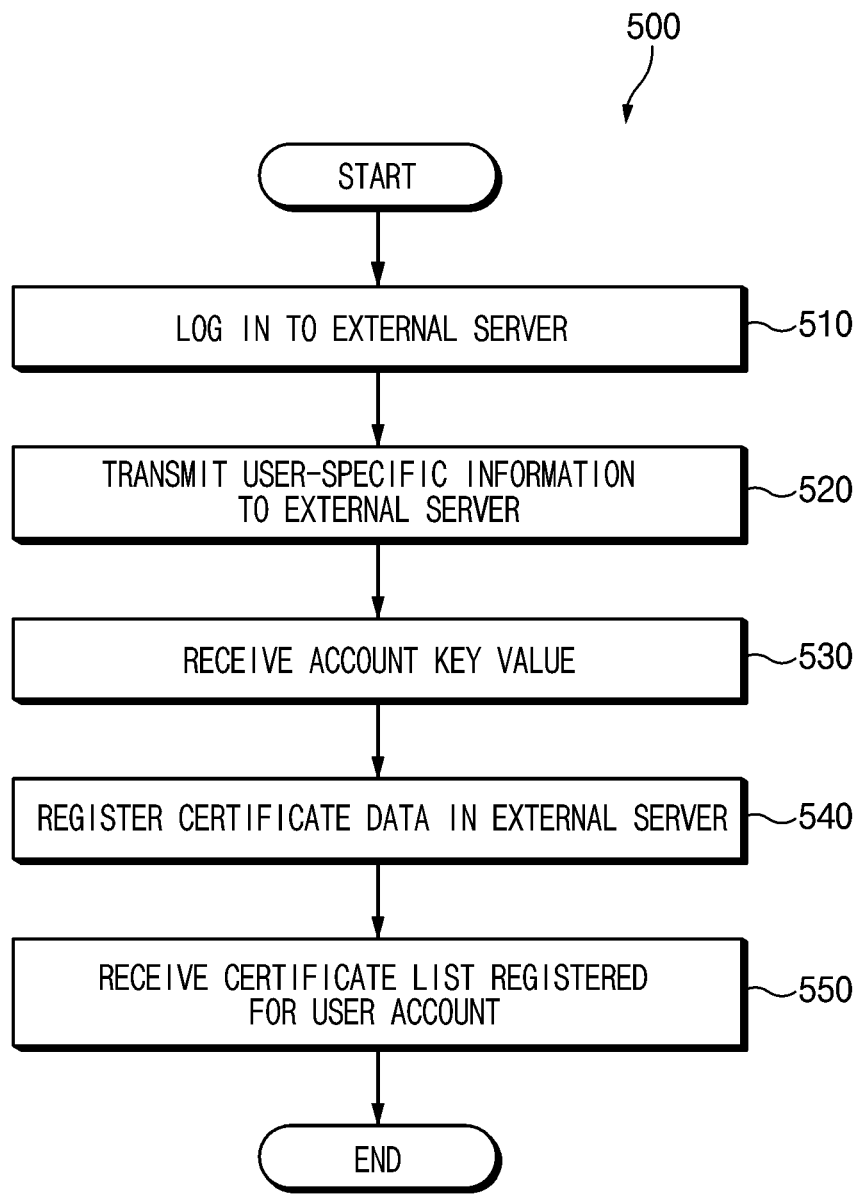
FIG. 5 is a flowchart illustrating a process in which an electronic device acquires a shared account key value and acquires a certificate list, according to an embodiment.

FIG. 5 is a flowchart 500 illustrating a process in which an electronic device (e.g., the electronic device 201 of FIG. 2) acquires a shared account key value and acquires a certificate list, according to an embodiment. Transmission of information between the electronic device and an external server to be described below may be performed through the long-range wireless communication protocol.

In operation 510, the electronic device may log in to an external server (e.g., the server 203 of FIG. 2) using a user account. For example, the electronic device may register user information to the external server through a service subscription process, create a user account, and then execute a login session with the external server based on the created user account.

In operation 520, the electronic device may transmit user-specific information for identifying a user to the external server. For example, the electronic device may transmit account credentials of the user account to the external server. The external server receiving the user-specific information may generate an account key value based on the user-specific information. In operation 530, the electronic device may receive the account key value generated by the external server.

The electronic device may generate certificate data. For example, the electronic device may generate a key pair including a private key and a public key generated based on a unique seed value of the electronic device. Here, public certificate data that is to be shared externally may include the public key. In operation 540, the electronic device may register the public certificate data in the external server. The external server may register the public certificate data for the user account logged in by the electronic device.

The operation of registering the certificate data in the external server may be performed by a plurality of devices. If operations 510 to 540 are performed through the same user account, the external server may register a plurality of certificate data for one user account. The external server may generate a certificate list including data of one or more certificates registered for one user account. In operation 550, the electronic device may receive the certificate list from the external server.

Figure 6:
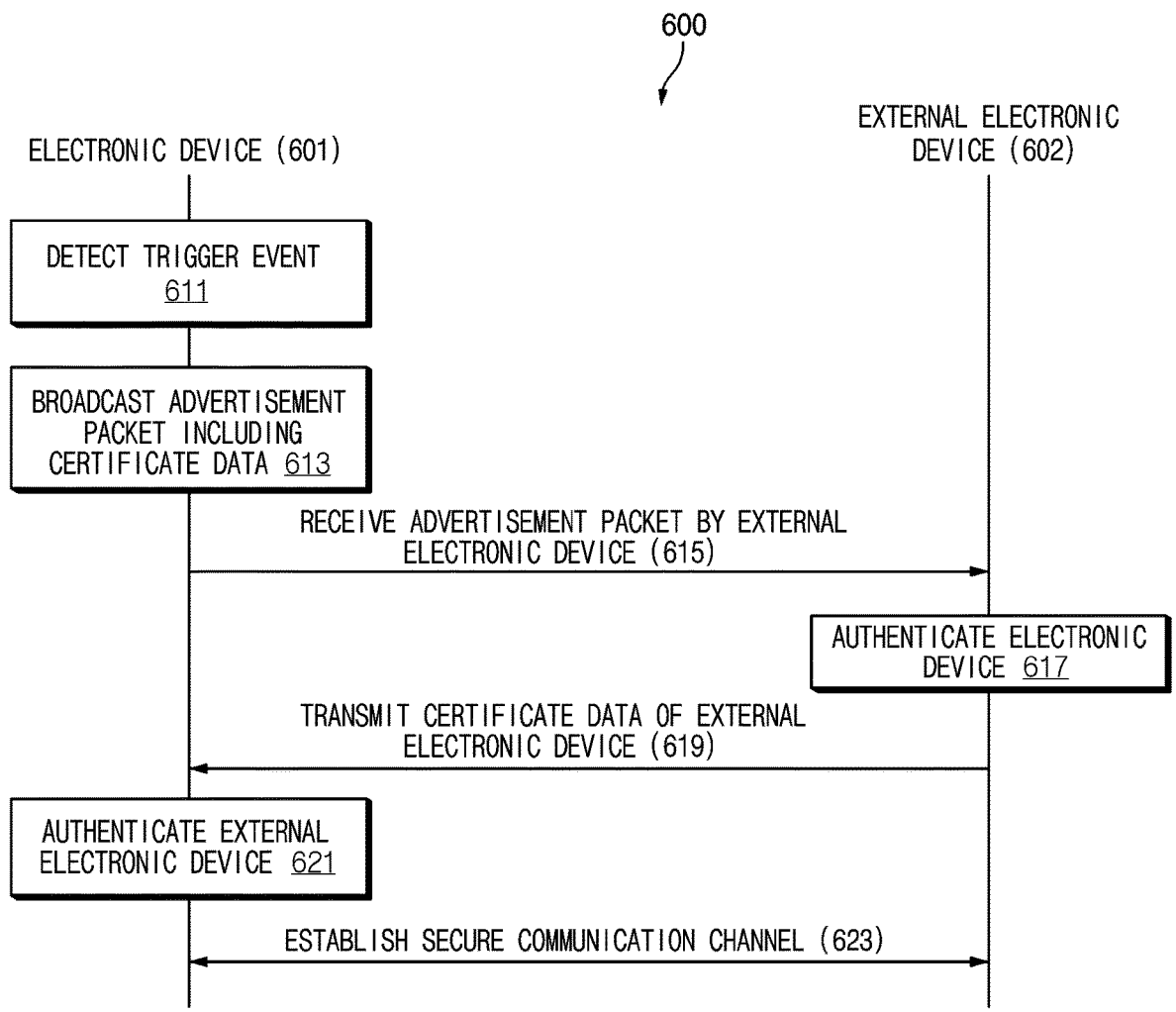
FIG. 6 is a flowchart illustrating a process in which an electronic device establishes communication connection with an external electronic device of another user, according to an embodiment.

FIG. 6 is a flowchart 600 illustrating a process in which an electronic device 601 (e.g., the electronic device 201 of FIG. 2) establishes a communication connection with an external electronic device 602 of another user (e.g., the external electronic device 202 of FIG. 2), according to an embodiment.

If a trigger event is detected in operation 611, in operation 613, the electronic device 601 may broadcast an advertisement packet including first certificate data of the electronic device 601.

If the external electronic device 602 receives the advertisement packet in operation 615, then in operation 617, the external electronic device 602 may authenticate the electronic device 601 based on the first certificate data included in the advertisement packet. According to an embodiment, the external electronic device 602 may authenticate the electronic device 601 through a process identical or similar to operation 621.

If authentication for the electronic device 601 is successfully completed, in operation 619, the external electronic device 602 may transmit a response packet including second certificate data of the external electronic device to the electronic device 601. In operation 621, the electronic device 601 may authenticate the external electronic device 602 based on the second certificate data acquired from the received response packet. In order to authenticate the external electronic device 602, the electronic device 601 according to an embodiment may determine that the external electronic device 602 is the authenticated device if the certificate list including certificate data for at least one trusted device from the external server includes second certificate data.

According to an embodiment, the electronic device 601 may acquire a certificate list from an external server (e.g., the server 203 of FIG. 2). The external server may acquire a first user identification information list including first user identification information capable of identifying the user of the electronic device 601 and information capable of identifying other users stored by the user of the electronic device 601. The first user identification information and the first user identification information list may be provided by the electronic device 601, but may also be provided through another device logged in to the external server with the same user account as the electronic device 601. In addition, the external server may acquire a second user identification information list including second user identification information capable of identifying the user of the external electronic device 602 and information capable of identifying other users stored by the user of the external electronic device 602. The second user identification information and the second user identification information list may be provided by the external electronic device 602, but may also be provided through another device logged in to the external server with the same user account as the external electronic device 602. If the first user identification information list includes the second user identification information and the second user identification information list includes the first user identification information, the external server may provide, to the electronic device 601, a certificate list including the second certificate data of the external electronic device 602. For example, if a user using a smartphone assigned with 1234 as a phone number stores contact information with a phone number 5678 in the contact storage of the smartphone and a user using a smartphone assigned with 5678 as a phone number stores contact information with the phone number 1234 in the contact storage of the smartphone, the external server receiving the contact information from the two smartphones may determine that the two devices are mutually trusted devices. If authentication of the external electronic device 602 is successfully completed in operation 621, then in operation 623, the electronic device 601 may share a session key with the external electronic device 602 and may establish a secure communication channel for communicating based on the session key.

Figure 7:
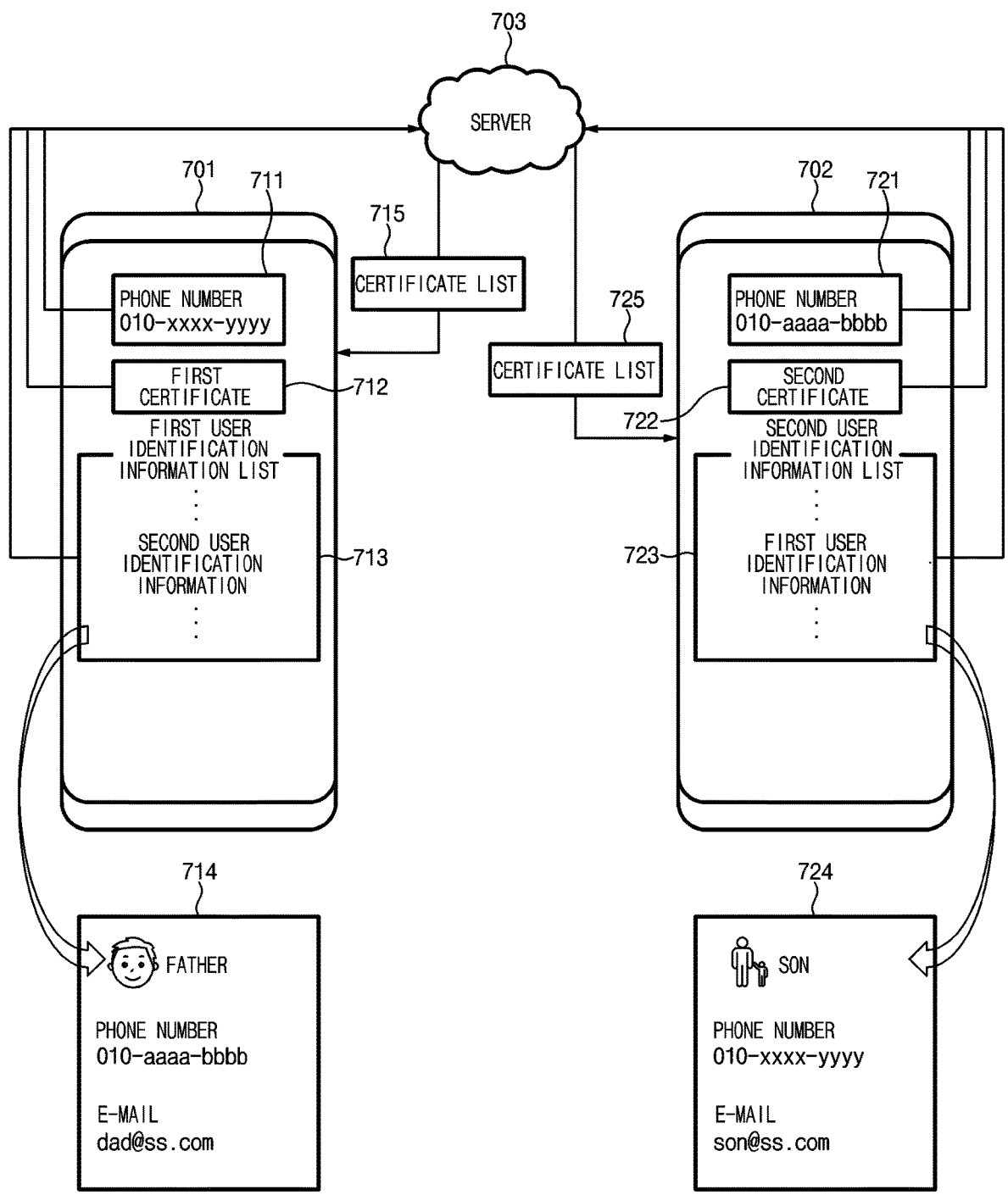
FIG. 7 conceptually illustrates a method for acquiring a certificate list from a server by an electronic device, according to an embodiment.

FIG. 7 conceptually illustrates a method for obtaining a certificate list from a server 703 (e.g., the server 203 of FIG. 2) by an electronic device 701 (e.g., the electronic device 201 of FIG. 2), according to an embodiment.

Referring to FIG. 7, the electronic device 701 is a device to which the phone number 000-xxxx-yyyy is assigned as first user identification information 711. The electronic device 701 may generate first certificate data 712, which is unique digital information that is capable of distinctly identifying the electronic device 701. The electronic device 701 may store a first user identification information list 713, including second user identification information 714. If the electronic device 701 logs in to the server 703, the electronic device 701 may transmit, to the server 703, the first user identification information 711, the first certificate data 712, and the first user identification information list 713.

Referring to FIG. 7, the external electronic device 702 is a device to which the phone number 010-aaaa-bbbb may be assigned as second user identification information 721. The external electronic device 702 may generate second certificate data 722, which, again, may be unique information capable of distinctly identifying the external electronic device 702. The external electronic device 702 stores a second user identification information list 723 including first user identification information 724. If the external electronic device 702 logs in to the server 703, the external electronic device 702 may transmit, to the server 703, the second user identification information 721, the second certificate data 722, and the second user identification information list 723.

The server 703 may compare the first user identification information 711 and the second user identification information list 723, and may compare the second user identification information 721 and the first user identification information list 713 with each other. The server 703 may provide certificate lists 715 and 725 generated based on the comparison result to the electronic device 701 and the external electronic device 702, respectively. According to an embodiment, if the second user identification information list 723 includes the first user identification information 711 and the first user identification information list 713 includes the second user identification information 721, the certificate list 715 may include the second certificate data 722, and the certificate list 725 may include the first certificate data 712. FIG. 7 illustrates an embodiment in which the first certificate data 712 and the second certificate data 722 are transmitted through the certificate lists 715 and 725, respectively; however, according to another embodiment, the server 703 may include the second certificate data 722 in the first user identification information list 713 and then transmit the first user identification information list 713 to the electronic device 701, and may include the first certificate data 712 in the second user identification information list 723 and then transmit the second user identification information list 723 to the external electronic device 702. According to another embodiment, the server 703 may include the certificate list 715 including the second certificate data 722 in the first user identification information list 713 and then transmit the first user identification information list 713 to the electronic device 701, and may include the certificate list 725 including the first certificate data 712 in the second user identification information list 723 and then transmit the second user identification information list 723 to the external electronic device 702.

Figure 8:
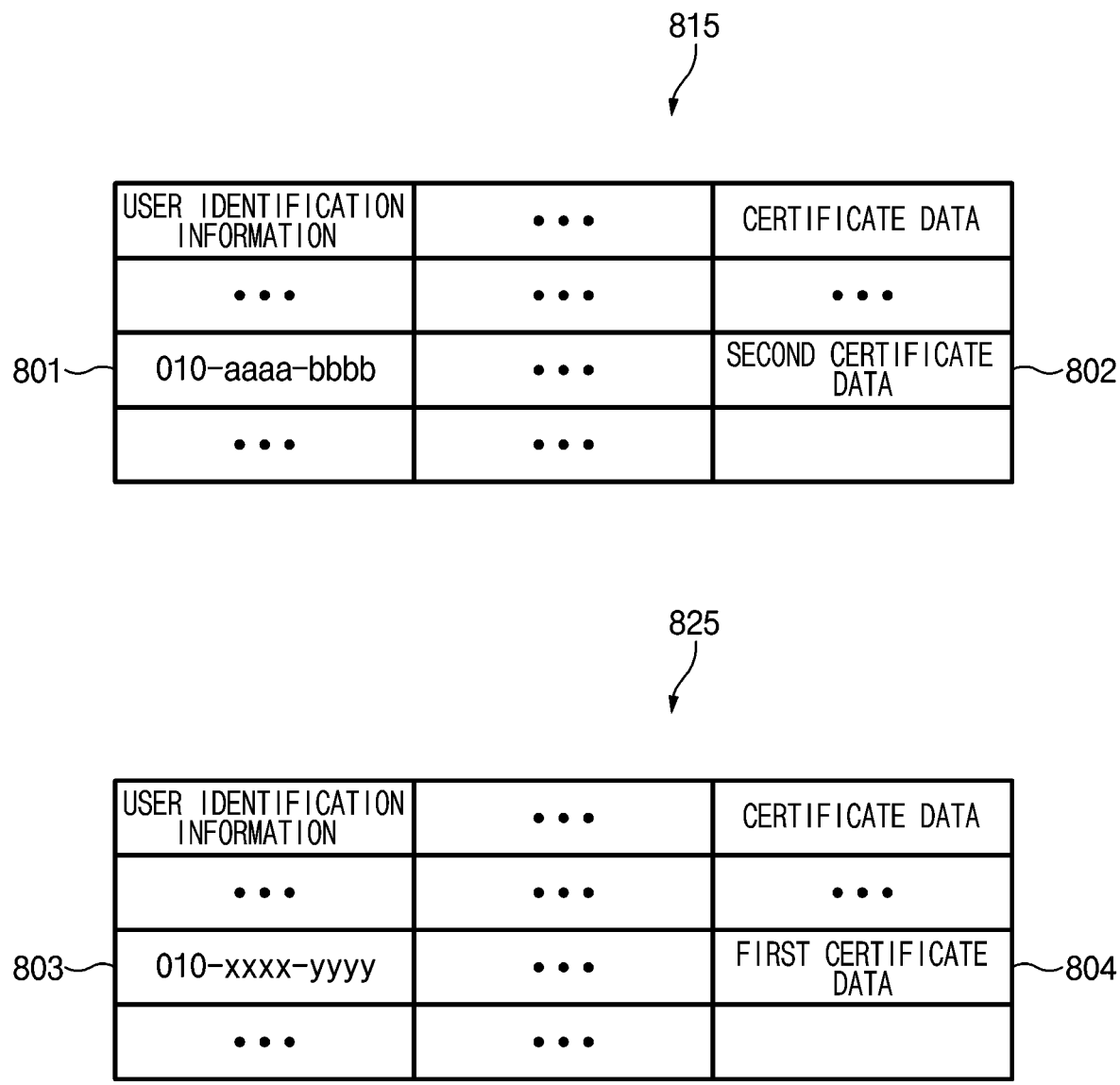
FIG. 8 illustrates an example of certificate lists acquired by an electronic device and an external electronic device, according to an embodiment.

FIG. 8 conceptually illustrates an example of certificate lists acquired by an electronic device (701 of FIG. 7) and an external electronic device (702 of FIG. 7), according to an embodiment.

Referring to FIG. 8, a certificate list 815 acquired by the electronic device (701 in FIG. 7) includes user identification information 801 and second certificate data 802 of the external electronic device (702 in FIG. 7). In addition, a certificate list 825 acquired by the external electronic device (702 in FIG. 7) may include user identification information 803 and first certificate data 804 of the electronic device (701 in FIG. 7).

Although not illustrated in FIG. 8, according to other embodiments, the electronic device (701 in FIG. 7) and the external electronic device (702 in FIG. 7) may acquire certificate data of the counterpart device through the user identification information list without receiving a separate certificate list (815 or 825). For example, the electronic device (701 in FIG. 7) may acquire, from a server (703 of FIG. 7), the first user identification information list (713 of FIG. 7) including the user identification information 801 and the second certificate data 802 of the external electronic device (702 of FIG. 7), and the external electronic device (702 of FIG. 7) may acquire, from the server (703 of FIG. 7), the second user identification information list (723 of FIG. 7) including the user identification data 803 and the first certificate data 804 of the electronic device (701 of FIG. 7).

Figure 9:
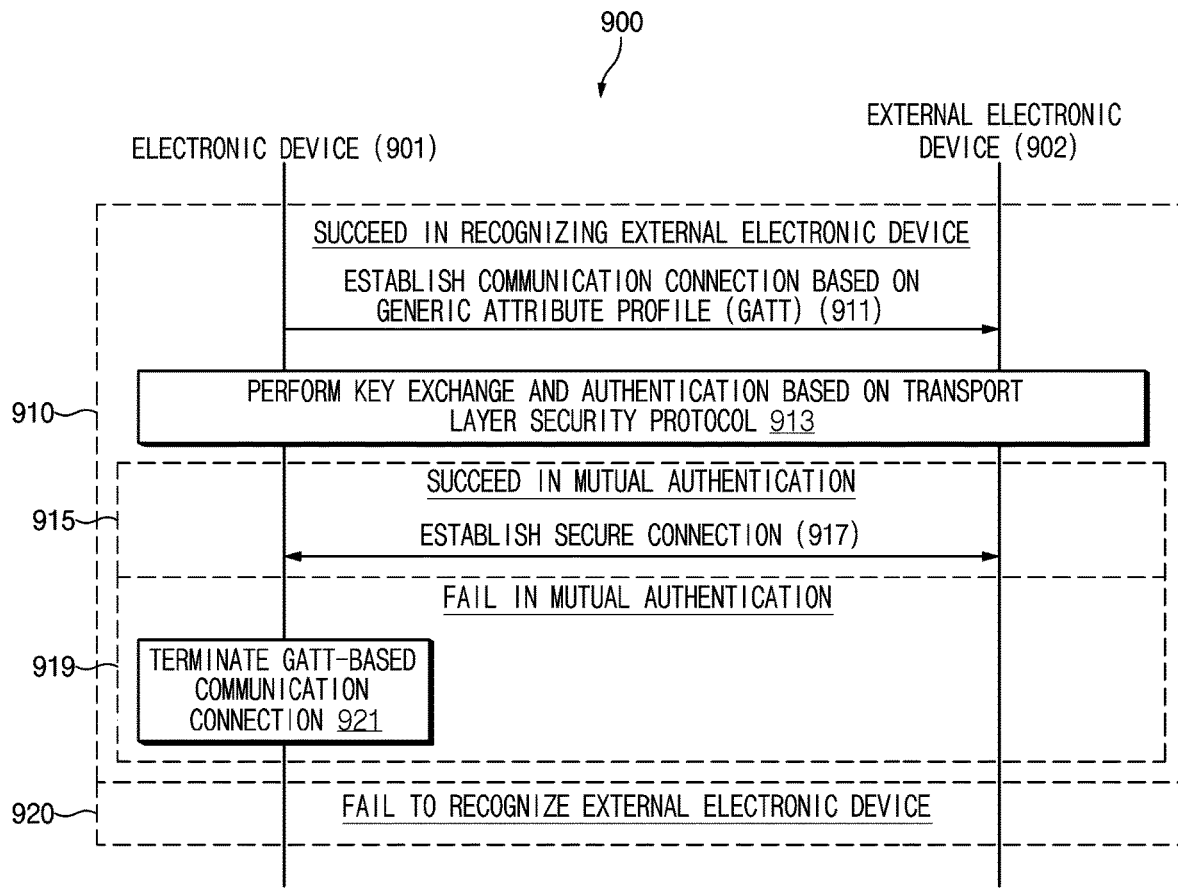
FIG. 9 is a flowchart illustrating a process in which an electronic device and an external electronic device perform mutual authentication, according to an embodiment.

FIG. 9 is a flowchart 900 illustrating a process in which an electronic device 901 (e.g., the electronic device 201 of FIG. 2) and an external electronic device 902 (e.g., the external electronic device 202 of FIG. 2) perform mutual authentication, according to an embodiment.

As a result of the electronic device 901 successfully recognizing the external electronic device 902 (e.g., operations 415 to 419 of FIG. 4), then in operation 911, the electronic device 901 according to an embodiment may establish a communication connection with the external electronic device 902 based on a generic attribute profile (GATT).

In operation 913, the electronic device 901 according to an embodiment may exchange a key with the external electronic device 902 based on a transport layer security (TLS) protocol. Here, the exchanged key may include first certificate data of the electronic device 901 and second certificate data of the external electronic device 902. The electronic device 901 and the external electronic device 902 may perform mutual authentication based on TLS. If mutual authentication is successful, the electronic device 901 may transmit data (e.g., content) to the external electronic device 902.

If the electronic device 901 and the external electronic device 902 succeed in mutual authentication (915), the electronic device 901 and the external electronic device 902 may establish a secure communication connection in operation 917. If the electronic device 901 and the external electronic device 902 fail in mutual authentication (919), the electronic device 901 may terminate the GATT-based communication connection in operation 921.

If the electronic device 901 performs an operation to recognize the external electronic device, and the external electronic device 902 is not recognized (920), the process between the electronic device 901 and the external electronic device 902 may not be performed.

In the example of FIG. 9, the electronic device 901 and the external electronic device 902 may generate a secure connection 915 after mutual authentication (e.g., operation 913). The electronic device 901 and the external electronic device 902 may share a personal identification number (PIN) code for generating a secure channel through the secure connection 915. For example, the PIN code may be used to generate a secure network channel. The secure network channel may be accessed by electronic devices having a corresponding PIN code (e.g., the electronic device 901 and the external electronic device 902). In this case, the electronic device 901 may share the PIN code with another trusted external electronic device to allow the external electronic device to access the secure network channel.

Figure 10:
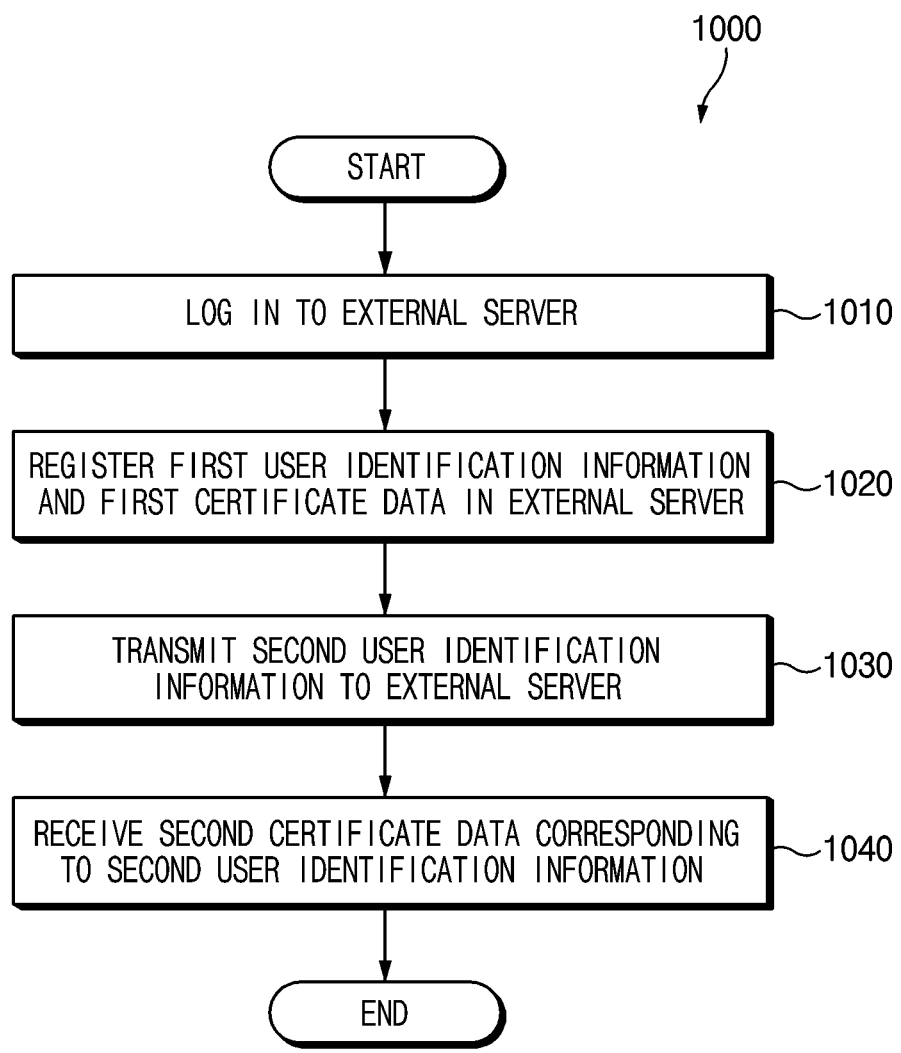
FIG. 10 is a flowchart illustrating a process in which an electronic device acquires certificate data of an external electronic device, according to an embodiment.

FIG. 10 is a flowchart 1000 illustrating a process in which an electronic device (e.g., the electronic device 201 of FIG. 2) acquires certificate data of an external electronic device (e.g., the external electronic device 202 of FIG. 2), according to an embodiment.

In operation 1010, the electronic device may log in to an external server using a user account. According to an embodiment, the electronic device may display a service subscription screen for proceeding with a service subscription process for generating the user account on the external server, and may receive information for service subscription. Using the service subscription screen, the electronic device may receive a user input regarding consent to provide first user identification information and second user identification information.

In operation 1020, the electronic device may register, in the external server, the first user identification information which may be used to identify a user. The electronic device may generate first certificate data and may register the generated first certificate data in the external server. In operation 1030, the electronic device registering the first user identification information and the first certificate data may transmit, to the external server, the second user identification information, which may be identification information identifying a trusted user. The second user identification information may be information stored by the user of the electronic device or fetched from a separate device that stores the identification information by the user of the electronic device.

If the external electronic device, which has registered the second user identification information as its own identification information on the external server, transmits, to the external server, the first user identification information as the identification information of the trusted device, then in operation 1040, the electronic device may acquire second certificate data corresponding to the second user identification information from the external server.

Figure 11:
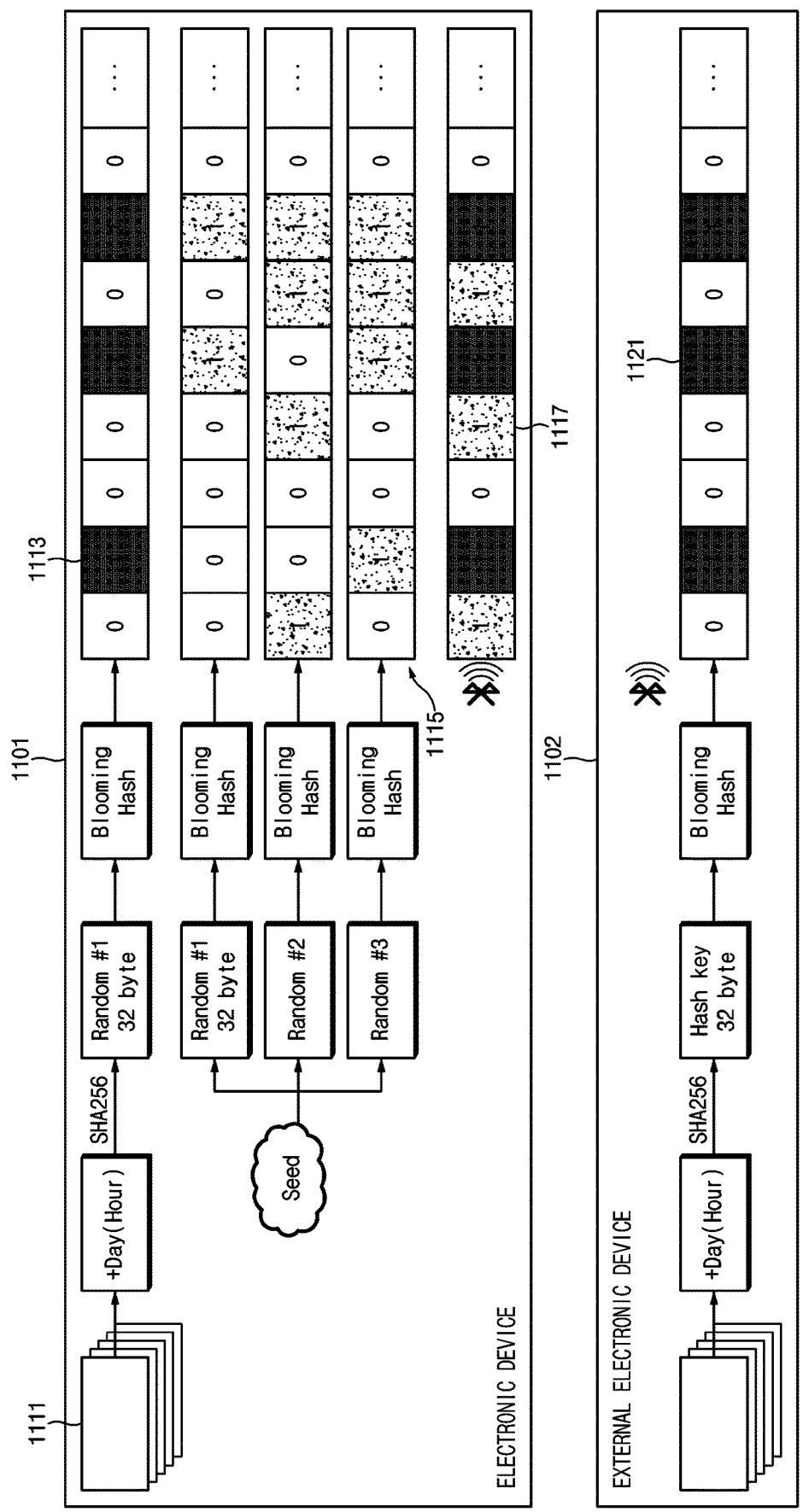
FIG. 11 illustrates an example of a transmission protocol for an electronic device to recognize an external electronic device by using data modulated by using a random number value, according to an embodiment.

FIG. 11 illustrates an example of a transmission protocol for an electronic device 1101 (e.g., the electronic device 201 of FIG. 2) to recognize an external electronic device 1102 (e.g., the external electronic device 202) by using data modulated by using a random number value, according to an embodiment.

The electronic device 1101 according to an embodiment may acquire a hash value from a selected account key 1111 using a hash algorithm (e.g., SHA-256). The electronic device 1101 may acquire a true/false array 1113 for the account key 1111 by applying a bloom hash filter to the acquired hash value.

The electronic device 1101 may generate a random number value and may acquire a true/false array 1115 for the random number value by applying the bloom hash filter to the generated random number value. The electronic device 1101 may generate a final true/false array 1117 by performing an OR operation on the true/false array 1115 for random number values at least once. The electronic device 1101 may broadcast the bloom filter 1117 configured in the final true/false array.

The external electronic device 1102 may acquire a hash value from the selected account key using the hash algorithm, and may acquire a true/false array 1121 by applying the bloom hash filter to the acquire hash value. If the external electronic device 1102 receives the broadcast bloom filter 1117, the external electronic device 1102 may recognize that the electronic device 1101 is nearby with a high probability compared to the true/false array 1121.

The application processors (e.g., the processor 120 of FIG. 1) of the electronic device 1101 and the external electronic device 1102 may be activated (or awakened) through the process illustrated in FIG. 11.

The bloom filter has a characteristic that no negative error does not occur in which although it is determined that an element does not belong to a set by the bloom filter, in fact, the element belongs to the set. Therefore, if an account-based signal generated in the electronic device 1101 is modulated and transmitted by utilizing the characteristics of the bloom filter, a situation does not occur in which the authentication procedure is not performed even though the external electronic device 1102 is the device of the user, and a situation occurs with a very low probability in which the authentication procedure is performed even though the external electronic device 1102 is not the device of the user, thereby making it possible recognize the device of the user with high accuracy.

In addition, the data structure of the bloom filter has the characteristic of occupying a small space. Accordingly, data may be transmitted in real time through a short-range wireless communication signal that transmits small data such as a BLE signal. If the method for modulating the signal transmitted by the electronic device 1101 is changed, privacy and tracking issues that the user does not recognize may be prevented.

Figure 12:
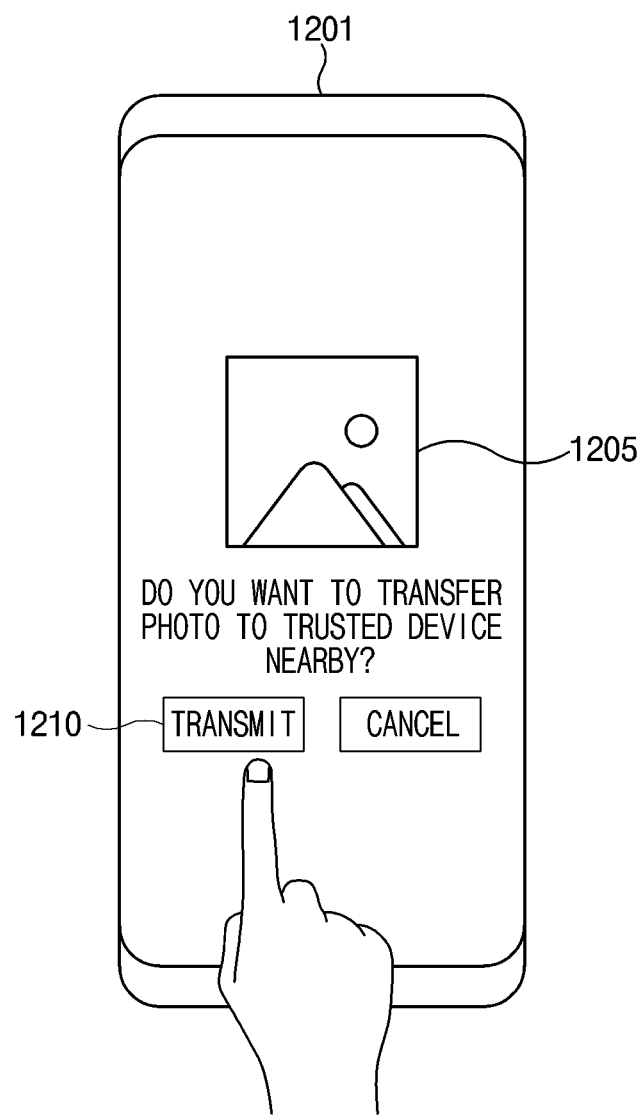
FIG. 12 illustrates an example in which an electronic device detects a trigger event through a user interface, according to an embodiment.

FIG. 12 illustrates an example in which an electronic device 1201 (e.g., electronic device 201 of FIG. 2) detects a trigger event through a user interface, according to an embodiment.

According to an embodiment, the electronic device 1201 may output a user interface item 1210 for receiving a user input detected as a trigger event to establish a communication connection with an external electronic device (e.g., the external electronic device 202 of FIG. 2). For example, referring to FIG. 12, the electronic device 1201 may detect a touch input selecting a user interface item 1210 requesting transmission of the image 1205 to a nearby device.

The electronic device 1201 according to an embodiment may perform a process (e.g., 300 of FIG. 3, 400 of FIG. 4, and 600 of FIG. 6) for establishing a communication connection with a nearby external electronic device.

Figure 13:
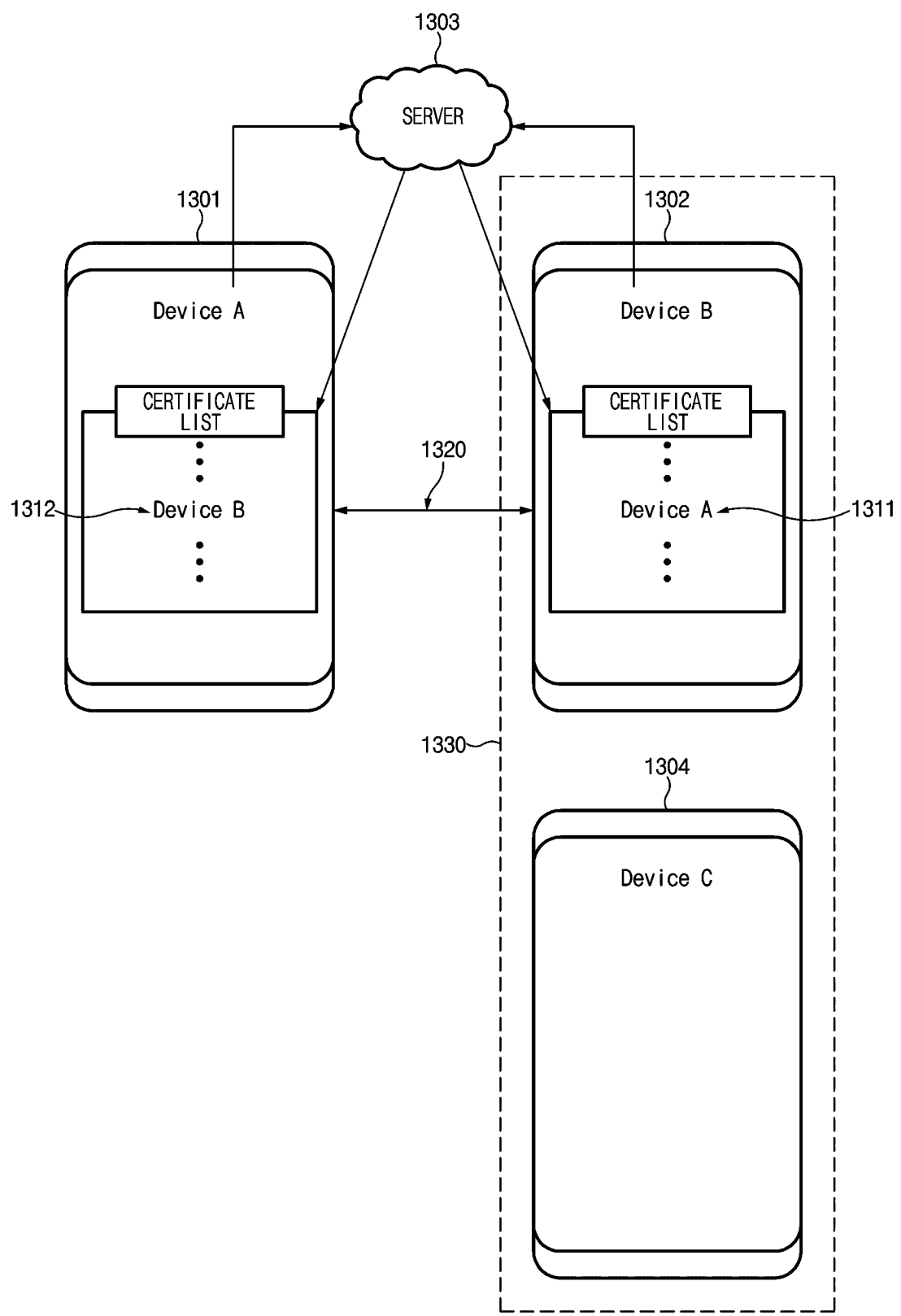
FIG. 13 conceptually illustrates a structure in which an electronic device authenticates a nearby external electronic device and establishes a communication connection with the external electronic device, according to an embodiment.

FIG. 13 conceptually illustrates a structure in which an electronic device 1301 (e.g., the electronic device 201 of FIG. 2) authenticates a nearby external electronic device 1302 (e.g., the external electronic device 202 of FIG. 2) and establishes a communication connection, according to an embodiment.

The electronic device 1301 according to an embodiment may register first certificate data of the electronic device 1301 in a server 1303. The server 1303 may acquire second certificate data of the external electronic device 1302 from the external electronic device 1302. The server 1303 may generate a certificate list of devices that the electronic device 1301 may trust, among devices registering the certificate data in the server 1303. For example, if two devices log in to the server 1303 with the same user account, or if two devices have each other's user identification information, the server 1303 may determine that the two devices are mutually trusted devices. The electronic device 1301 may acquire, from the server 1303, a certificate list including second certificate data 1312.

The electronic device 1301 may establish a secure communication connection 1320 with the external electronic device 1302 of which the second certificate data 1312 is included in the certificate list of the electronic device 1301 and which has the first certificate data 1311 of the electronic device 1301, among devices 1330 located nearby. The electronic device 1301 may not establish a communication connection with the device 1304 of which the certificate data is not included in the certificate list of the electronic device 1301 or which does not have the first certificate data of the electronic device 1301.

FIG. 13 illustrates an embodiment in which the certificate data is generated from a separate certificate list; however, according to other embodiments, the certificate list or the certificate data may be included in the user identification information list. For example, the server 1303 may insert the second certificate data of the external electronic device 1302 or the certificate list including the second certificate data into a user identification information list of the electronic device 1301 (e.g., the first user identification information list of FIG. 7), and the electronic device 1301 may acquire the second certificate data through the first user identification information list 713 received from the server 1303.

Figure 14:
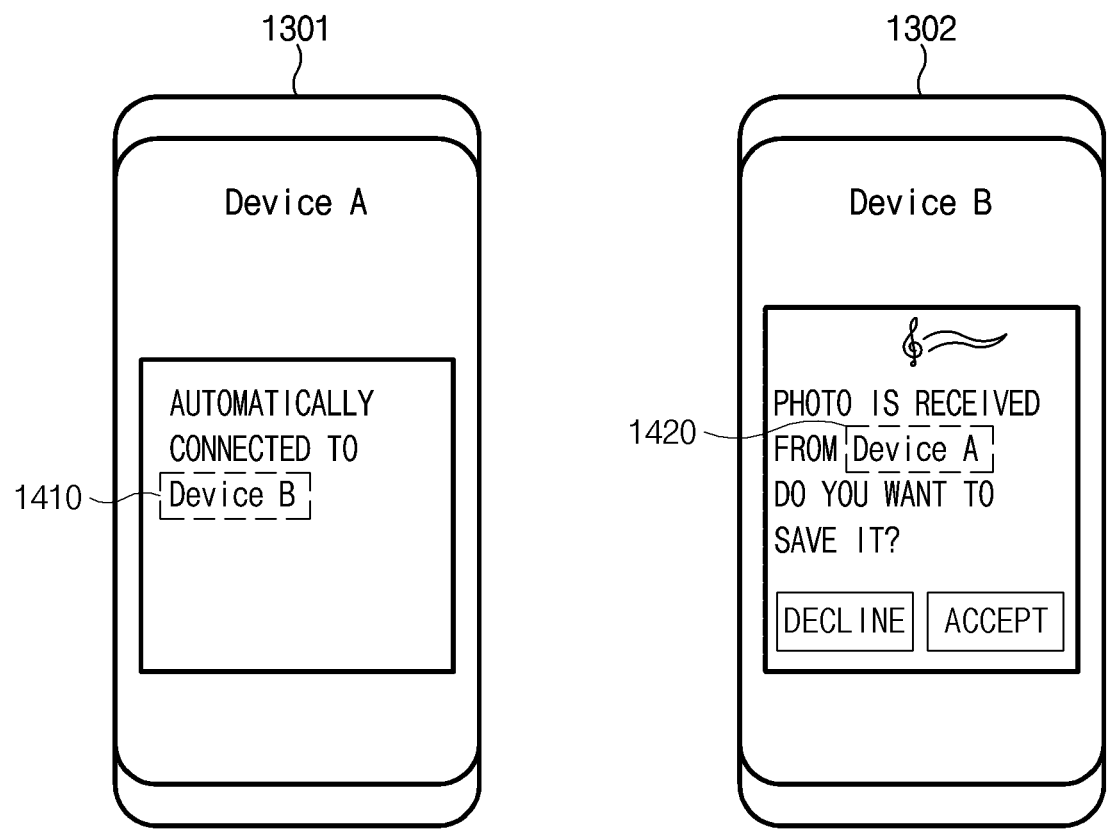
FIG. 14 illustrates an example of screens displayed by an electronic device and an external electronic device logged in with the same user account in a process in which the electronic device shares content using a communication channel connected with the external electronic device, according to an embodiment.

FIG. 14 illustrates an example of screens displayed by an electronic device 1301 and an external electronic device 1302, which are both "logged in" with the same user account, in a process by which the electronic device 1301 may share content across a communication channel with the external electronic device 1302, according to an embodiment.

The electronic device 1301 according to an embodiment may receive, from an external server (e.g., the server 203 of FIG. 2), device identification information about the external electronic device 1302 registered in the external server together with the certificate of the external electronic device 1302. The device identification information may be, for example, a nickname set by a user for the external electronic device 1302 registered in the external server. Alternatively, the device identification information about the external electronic device 1302 may be set locally in the electronic device 1301. If the communication connection with the external electronic device 1302 is established (e.g., operation 429 of FIG. 4), the electronic device 1301 according to an embodiment may display a visual item 1410 indicating device identification information about the external electronic device 1302).

According to an embodiment, the electronic device 1301 may display a device list including device identification information indicating at least one external electronic device 1302 for which mutual authentication is completed. If a user input for selecting device identification information indicating the external electronic device 1302 in the device list is received, the electronic device 1301 may transmit data for sharing content to the external electronic device 1302.

If content is received through the communication connection connected with the electronic device 1301, the external electronic device 1302 according to an embodiment may display a visual item 1420 indicating device identification information indicating the electronic device 1301 that transmits the content.

Figure 15:
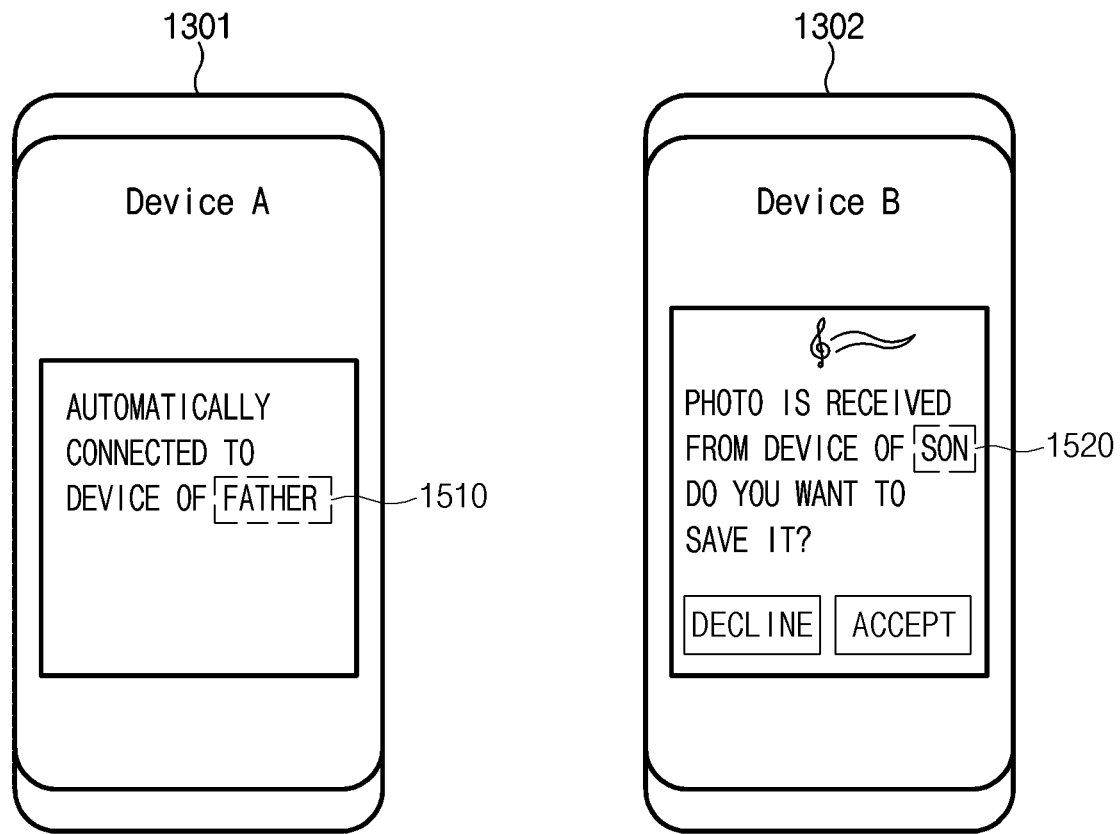
FIG. 15 illustrates an example of screens displayed by an electronic device and an external electronic device of another user in a process in which the electronic device shares content using a communication channel connected with the external electronic device, according to an embodiment.

FIG. 15 illustrates an example of screens displayed by an electronic device 1301 and an external electronic device 1302 of another user in a process in which the electronic device 1301 shares content using a communication channel connected with the external electronic device 1302, according to an embodiment.

The electronic device 1301 may store the second certificate data of the certificate list and the second user identification information of the external electronic device 1302 stored in a storage (e.g., contact storage) of the electronic device 1301 in association with each other. For example, if the second user identification information is Father's contact information, the electronic device 1301 may store Father's contact information including the second certificate data. Alternatively, the electronic device 1301 may receive contact information including the second certificate data from an external server (e.g., the server 203 of FIG. 2).

If a communication connection with the external electronic device 1302 is established based on the second certificate data, the electronic device 1301 may display a visual item 1510 indicating the second user identification information through a display (e.g., the display device 160 of FIG. 1). The visual item 1510 indicating the second user identification information may be, for example, a nickname included in the contact information.

According to an embodiment, the electronic device 1301 may display a device list including user identification information indicating at least one external electronic device 1302 for which mutual authentication is completed. If a user input for selecting user identification information indicating the external electronic device 1302 in the device list is received, the electronic device 1301 may attempt to transmit data for sharing content to the external electronic device 1302.

If content is received through the communication connection established based on the first certificate data of the electronic device 1301, the external electronic device 1302 according to an embodiment may display a visual item 1520 indicating the first user identification information indicating the electronic device 1301.

Figure 16:
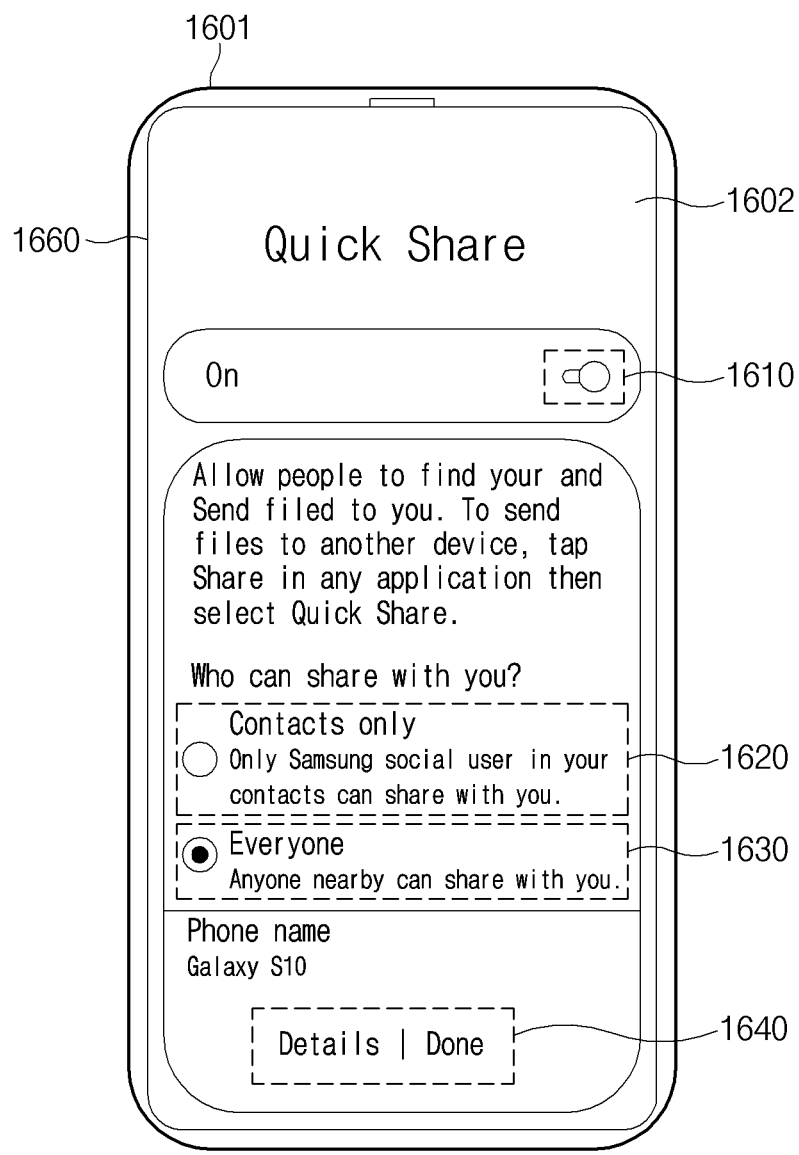
FIG. 16 illustrates a user interface (UI) indicating a data sharing state according to an embodiment.

FIG. 16 illustrates a setting UI 1602 of an electronic device according to an embodiment.

In FIG. 16, an electronic device 1601 (e.g., the electronic device 201 of FIG. 2) may provide the setting UI 1602 on a display 1660. For example, the setting UI 1602 may provide settings for sharing content. For example, the setting UI 1602 may include an interface 1610 (e.g., a selectable on-screen toggle) for setting activation of content sharing. For example, the electronic device 1601 may activate or deactivate a content sharing function based on an input to the interface 1610.

For example, the setting UI 1602 may provide content sharing range setting. If the electronic device 1601 is set to a "friend" mode 1620, the electronic device 1601 is limited to sharing content with known contacts, which may correspond to the external electronic device(s) previously stored in the contacts listing of the electronic device 1601 and the user's other electronic device(s). If the electronic device 1601 is set to an "all" mode 1630, the electronic device 1601 may share content with all nearby external electronic devices. For example, in the friend mode 1620, the electronic device 1601 may not display an advertising packet on the display 1660 even if the electronic device 1601 receives the advertising packet from an electronic device other than the user's electronic device and/or an external electronic device that is not stored in the contact.

According to an embodiment, when content sharing is activated (e.g., when sharing is activated in response to receiving input to the interface 1610), or when an input indicating completion (e.g., an input selecting "Done" button 1640) is received in a state in which content sharing is activated, the electronic device 1601 may broadcast the advertising signal (e.g., operation 415 of FIG. 4 or operation 613 of FIG. 6).

Figure 17:
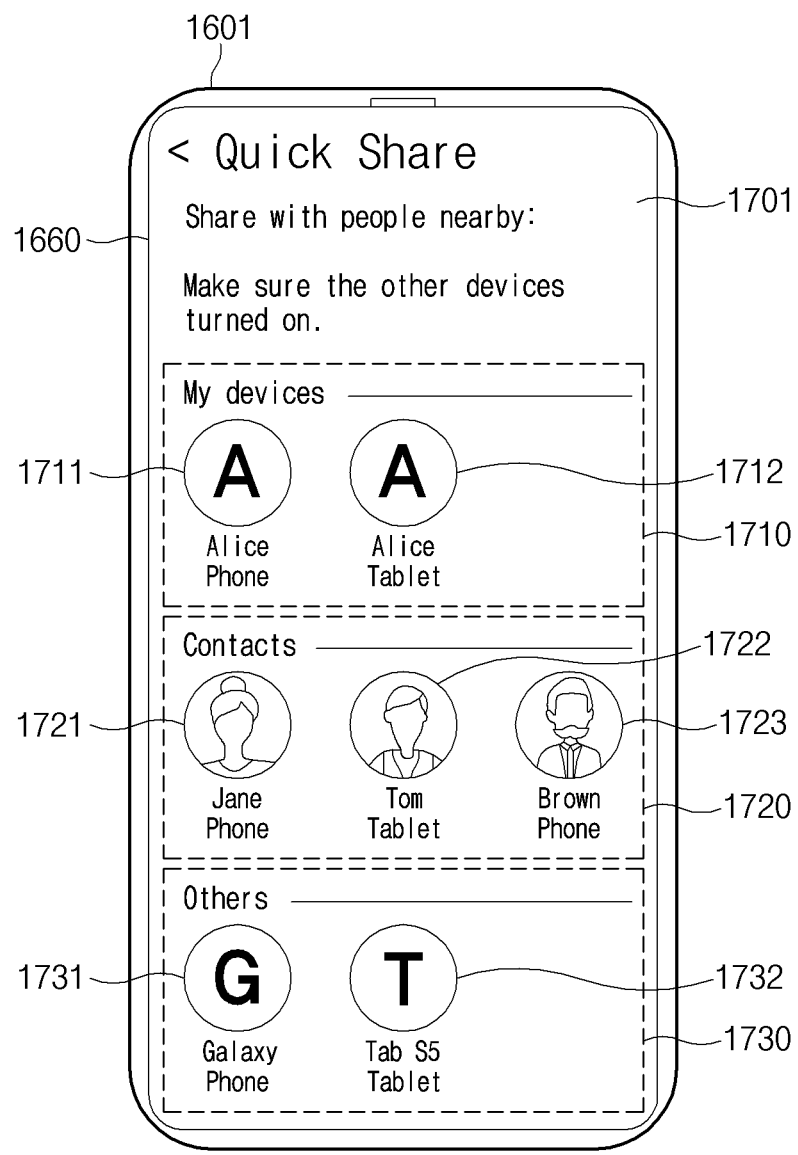
FIG. 17 illustrates a sharing UI of an electronic device according to an embodiment.

FIG. 17 illustrates a sharing UI 1701 of an electronic device according to an embodiment.

For example, the electronic device 1601 (e.g., the electronic device 201 of FIG. 2) may display, on the display 1660, the sharing UI 1701 providing information on the recognized external electronic device and allowing selection. For example, external electronic devices displayed on the sharing UI 1701 may be external electronic devices recognized by receiving advertising signals from external electronic devices.

According to an embodiment, the electronic device 1601 may generate a list of external electronic devices based on types of the external electronic devices. For example, the sharing UI 1701 may include an "owned" electronic device list 1710 (e.g., "my devices"), a contact-based device list 1720, and another electronic device list 1730. The owned electronic device list 1710 may include information on other electronic devices (e.g., the first same account device 1711 and the second same account device 1712) belonging to the same account as the electronic device 1601. The contact-based device list 1720 may include information on external electronic devices (e.g., a first external electronic device 1721, a second external electronic device 1722, and a third external electronic device 1723) matching contact information of the electronic device 1601. For example, the contact-based device list 1720 may include at least one of external electronic devices (e.g., the first external electronic device 1721, the second external electronic device 1722, or the third external electronic device 1723) that transmit a response signal (e.g., an advertising signal) to an advertising signal transmitted by the electronic device 1601. For example, the electronic device 201 may display the contact-based device list 1720 based on identification information (e.g., contact information such as phone number, email address or mail account, device-specific identification information such as international mobile equipment identity (IMEI), or service subscriber identification information such as social media service account) received from the external electronic devices. The other electronic device list 1730 may include information on electronic devices that do not belong to the account of the electronic device 1601 and do not match contact information (for example, a first other device 1731 and a second other device 1732).

According to an embodiment, the electronic device 1601 may receive an input of selecting at least one external electronic device to transmit content, among external electronic devices in the list of external electronic devices (e.g., the owned electronic device list 1710, the contact-based device list 1720, or the other electronic device list 1730) displayed on the sharing UI 1701. The electronic device 1601 may establish a secure communication channel (e.g., operation 623 of FIG. 6) by transmitting a connection request signal to at least one external electronic device based on the selection input and receiving a response thereto from at least one external electronic device.

According to an embodiment, if an external electronic device having the same account as its own account is found nearby, the electronic device 1601 may display the corresponding external electronic device in the owned electronic device list 1710. For example, the electronic device 1601 may not perform a separate mutual authentication on the external electronic device of its own account, and may display the corresponding external electronic device in the owned electronic device list 1710. If the electronic device 1601 transmits data to the external electronic device included in the owned electronic device list 1710, the electronic device 1601 may authenticate the external electronic device by using certificate data stored in the electronic device 1601. If authentication is successfully performed, the electronic device 1601 may transmit content (e.g., data) to the corresponding external electronic device.

According to an embodiment, if an external electronic device included in its own contact storage is found nearby, the electronic device 1601 may display the external electronic device in the contact-based device list 1720. If data is transmitted to the external electronic device included in the contact-based device list 1720, authentication for the external electronic device may be performed. For example, the electronic device 1601 may recognize and authenticate the external electronic device based on data (e.g., a certificate and/or hash information related to a certificate) received from nearby external electronic devices and data (e.g., a certificate and/or hash information related to a certificate) stored in the contact of the electronic device 1601. For example, when data is transmitted to the external electronic device in the contact-based device list 1720, the electronic device 1601 may perform mutual authentication with the external electronic device by using a certificate in the contact storage. The electronic device 1601 may transmit data to the external electronic device if mutual authentication is successfully performed.

According to an embodiment, if an external electronic device other than its owned electronic device and the electronic devices in the contact is found nearby, the electronic device 1601 may display the external electronic device in the other electronic device list 1730. If data is transmitted to the external electronic device included in the other electronic device list 1730, authentication for the external electronic device may be performed. According to an embodiment, the electronic device 1601 may authenticate the external electronic device included in the other electronic device list 1730 based on a personal identification number (PIN) code. For example, the electronic device 1601 may not store certificate data for the external electronic device in the other electronic device list 1730. In this case, the electronic device 1601 may generate a PIN code for establishing a secure channel and may perform mutual authentication for the external electronic device based on the PIN code.

According to an embodiment, the electronic device 1601 may display some of the identified external electronic devices on the sharing UI 1701. For example, based on the states of the external electronic devices received from the external electronic devices, the electronic device 1601 may determine whether to display the external electronic device. If the external electronic device transmits information indicating the screen-off state, the electronic device 1601 may not display the corresponding external electronic device on the sharing UI 1701. If the external electronic device transmits information indicating the screen-on state, the electronic device 1601 may display the corresponding external electronic device on the sharing UI 1701. If the external electronic device accepts content sharing, the electronic device 1601 may be set to display the corresponding external electronic device on the sharing UI 1701.

In the example of FIG. 17, if the electronic device 1601 is set to the friend mode 1620 of FIG. 16, the electronic device 1601 may omit the other electronic device list 1730 from the sharing UI 1701.

Figure 18:
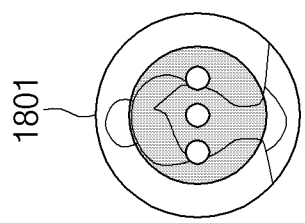
FIG. 18 illustrates examples of icons according to a data sharing situation according to an embodiment.
Figure 18:
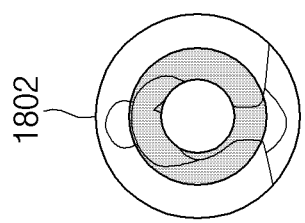
Figure 18:
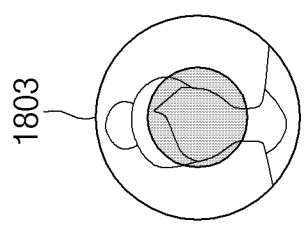
Figure 18:
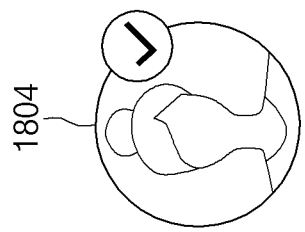
Figure 18:
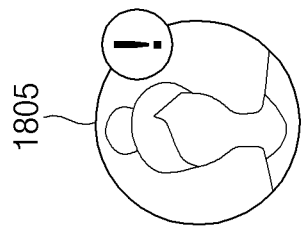

FIG. 18 illustrates examples of icons according to a data sharing situation according to an embodiment.

According to an embodiment, an electronic device (e.g., the electronic device 1601 of FIG. 17) may display a state of an external electronic device through icons of the sharing UI 1701. In FIG. 18, various state display icons based on the first external electronic device 1721 of FIG. 17 may be described.

According to an embodiment, the electronic device 1601 may display icons based on a communication state. A first icon 1801 indicates that data transmission to a corresponding external electronic device is pending. For example, when data for another external electronic device is being transmitted, and the corresponding external electronic device is waiting to receive data after data transmission to the other external electronic device is completed, the corresponding electronic device may be displayed in a form similar to the first icon 1801. A second icon 1802 indicates that a secure connection to the corresponding external electronic device is being established. For example, while performing operations 415 to 429 of FIG. 4, the electronic device 1601 may display the external electronic device in a form similar to the second icon 1802. A third icon 1803 indicates that data is being transmitted to the corresponding external electronic device. A fourth icon 1804 indicates that data transmission to the corresponding external electronic device is successfully completed. A fifth icon 1805 indicates that data transmission to the corresponding external electronic device has at least partially failed.

The icons illustrated in FIG. 18 are merely examples, and embodiments of the present disclosure are not limited thereto. For example, the electronic device 1601 may display the state of the external electronic device by using text information.

Figure 19:
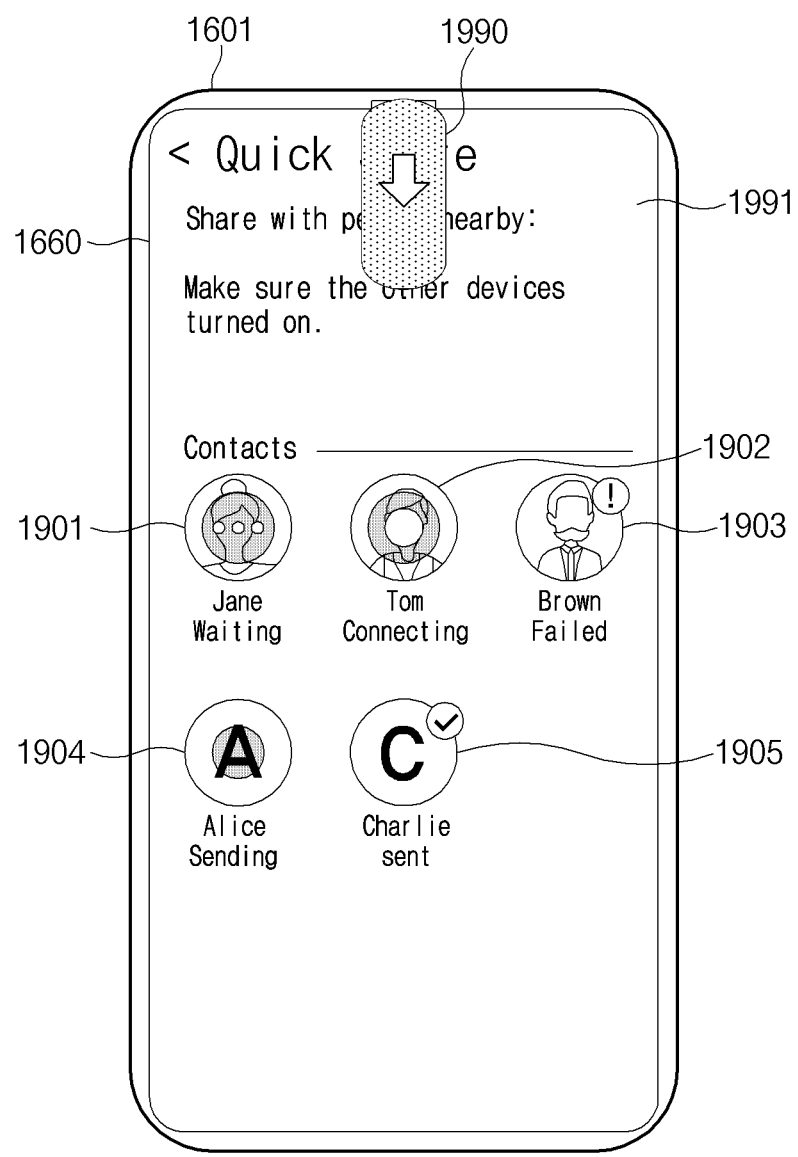
FIG. 19 illustrates a UI indicating a data sharing state according to an embodiment.

FIG. 19 illustrates a UI 1991 indicating a data sharing state according to an embodiment.

In the example of FIG. 19, the electronic device 1601 (e.g., the electronic device 201 of FIG. 2) may display the UI 1991 indicating a data sharing state on the display 1660. The electronic device 1601 may provide sharing state information by using an icon and text. For example, a first electronic device 1901 may indicate waiting, a second electronic device 1902 may indicate connecting, a third electronic device 1903 may indicate that data fails to be transmitted, a fourth electronic device 1904 may indicate that data is being transmitted, and a fifth electronic device 1905 may indicate that data transmission is completed.

Figure 20:
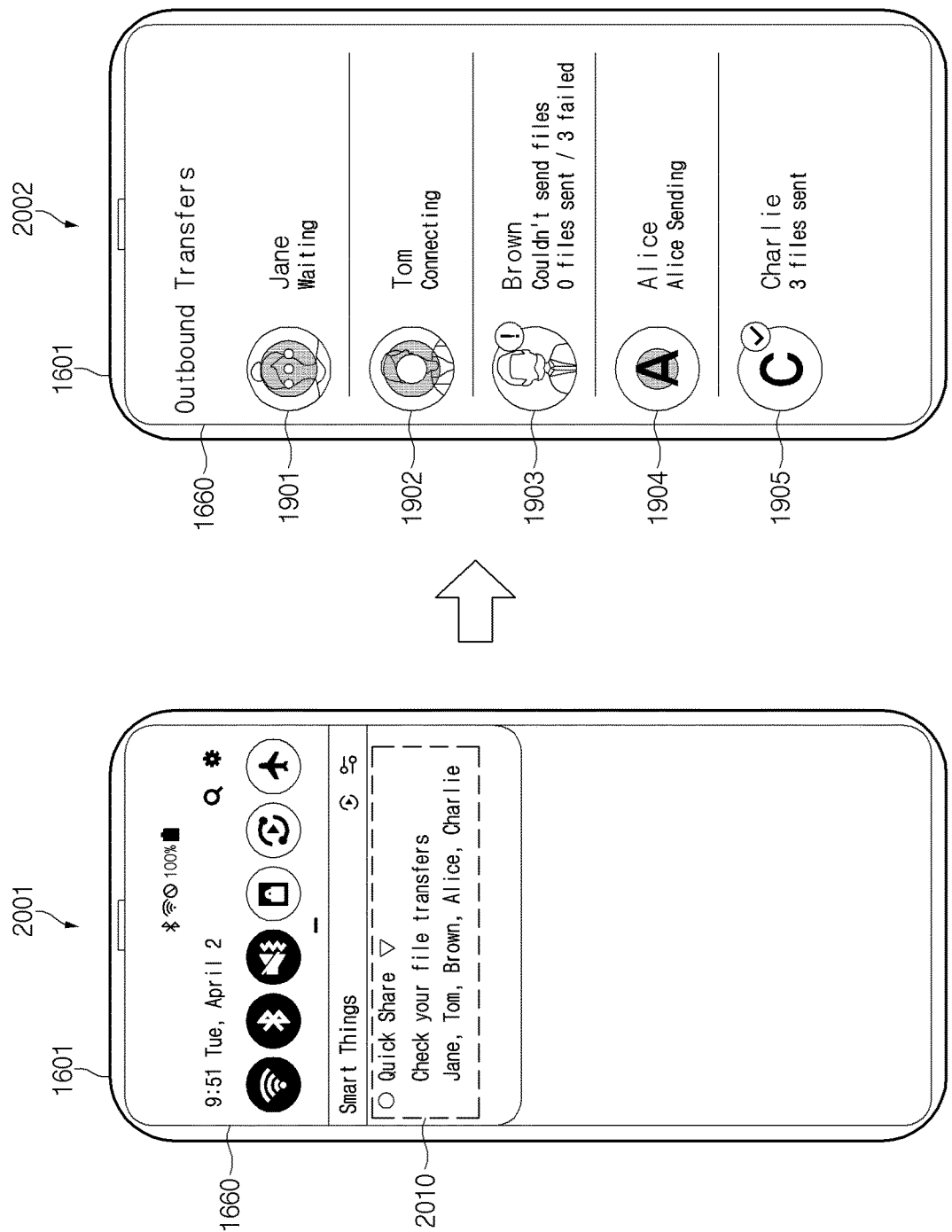
FIG. 20 illustrates a UI indicating a data sharing state according to an embodiment.

If an input for activating a notification bar (e.g., a drag input 1990) is received, the electronic device 1601 may display the UI of FIG. 20 on the display 1660.

FIG. 20 illustrates a UI indicating a data sharing state according to an embodiment.

With reference to reference numeral 2001, in response to an input for activating the notification bar of FIG. 19 (e.g., the drag input 1990), the electronic device 1601 may display a notification bar including a data sharing state notification 2010. The sharing state notification 2010 may include brief information on data sharing (e.g., information on an external electronic device to be shared).

With reference to reference numeral 2002, if an input for the sharing state notification 2010 is received, the electronic device 1601 may provide a specific sharing state. For example, the sharing state information of reference numeral 2001 may include more specific information than the UI 1991 indicating the sharing state of FIG. 19. For example, for the third electronic device 1903, the electronic device 1601 may display, on the display 1660, how many of the files have failed to be transmitted. For the fifth electronic device 1905, the electronic device 1601 may display, on the display 1660, how many files have been successfully transmitted.

FIG. 21 illustrates a connection request UI in an external electronic device.

According to an embodiment, an electronic device (e.g., the electronic device 1601 of FIG. 15) may transmit a connection request to an external electronic device 2102 (e.g., the external electronic device 202 of FIG. 2). For example, after authentication of the external electronic device 2102 (e.g., operation 621 in FIG. 6), and before the establishment of the secure communication channel (e.g., operation 623 in FIG. 6), the electronic device 1601 may transmit the connection request to the external electronic device 2102. For example, if the connection request is accepted by the external electronic device 2102, the electronic device 1601 may establish the secure communication channel.

Connection request UIs of FIG. 21 may be displayed on the display 2160 of the external electronic device 2102 when the connection request is received from the electronic device. The connection request UI may include information that prompts the user of the external electronic device 2102 to receive content.

With reference to reference numeral 2191, a connection request UI 2110 may be a pop-up message inquiring whether to receive a file. For example, the connection request UI 2110 may include information 2113 of a file sender (e.g., Alice), the number of files 2112 (e.g., 3), and/or PIN code information 2111 (e.g. 007893). In an example, if the external electronic device 2102 does not acquire information on the number of files from the connection request, the number of files 2112 may be omitted.

With reference to reference numeral 2102, a connection request UI 2120 may be a pop-up message inquiring whether to receive a file. For example, the connection request UI 2120 may include information 2113 of a file sender (e.g., Alice), the number of files 2112 (e.g., 3), and/or a thumbnail 2121 of the file. For example, after transmitting a connection request signal, the electronic device 1601 may transmit data of the thumbnail 2121 to the external electronic device 2102 by using one or more signals. For another example, the electronic device 1601 may transmit the address of the thumbnail 2121 (e.g., a uniform resource locator (URL) or a compressed URL) to the external electronic device 2102. For yet another example, the electronic device 1601 may transmit summary information of a file instead of the thumbnail 2121. In this case, the summary information may include information (e.g., text information) extracted based on machine learning on the content to be transmitted.

According to an embodiment, the external electronic device 2102 may display the connection request UI based on a relationship with the electronic device 1601. For example, if the external electronic device 2102 is an electronic device of an account stored in the contact of the electronic device 1601, the external electronic device 2102 may display the connection request UI 2120 of reference numeral 2192. For another example, if the external electronic device 2102 is another device (for example, the other device 1731 or 1732 of FIG. 17), the external electronic device 2102 may communicate with the electronic device 1601 based on the PIN code. In this case, the external electronic device 2102 may display the connection request UI 2110 of reference numeral 2191.

If the external electronic device 2102 receives a connection acceptance input (e.g., an input for "Accept"), the external electronic device 2102 may transmit, to the electronic device 1601, a response signal indicating connection acceptance. For example, if the connection acceptance response is received, the electronic device 1601 may establish a secure connection with the external electronic device 2102. If the external electronic device 2102 receives a connection decline input (e.g., an input for "Decline"), the external electronic device 2102 may transmit, to the electronic device 1601, a response signal indicating connection decline. In this case, the electronic device 1601 may display information indicating failure of data transmission (e.g., the fifth icon 1805 of FIG. 18).

As described above, an electronic device disclosed herein may include a memory configured to store a certificate list including first certificate data of the electronic device and second certificate data of an external electronic device, a short-range wireless communication circuit, and a processor operatively connected to the memory and the short-range wireless communication circuit, and the memory may store instructions that, when executed, cause the processor to detect a trigger event for executing an operation of establishing a communication connection with a device around the electronic device, control the short-range wireless communication circuit to broadcast an advertisement packet generated based on the first certificate data, in response to detection of the trigger event, acquire third certificate data from a response packet, if the response packet is received from the external electronic device in response to the advertisement packet, authenticate the external electronic device based on the second certificate data and the third certificate data, and establish a secure communication channel with the external electronic device if the external electronic device is authenticated.

According to an embodiment of the present disclosure, the instructions, when executed, may cause the processor to acquire a first hash value from the first certificate data using a hash function, generate the advertisement packet so as to include the first hash value, acquire the third certificate data including a second hash value from the response packet, and authenticate the external electronic device based on a result of comparing the second hash value with a hash value generated from the second certificate data.

According to an embodiment of the present disclosure, the electronic device may further include a long-range wireless communication circuit configured to communicate with an external server, and the instructions, when executed, may cause the processor to register the first certificate data and first user identification information on the electronic device in the external server to which the electronic device logs in based on a user account, through the long-range wireless communication circuit.

According to an embodiment of the present disclosure, the memory may be configured to store second user identification information on the external electronic device, and the instructions, when executed, may cause the processor to transmit the second user identification information to the external server to which the electronic device logs in based on the user account, through the long-range wireless communication circuit, and receive, from the external server, the second certificate data corresponding to the second user identification information in response to the second user identification information, through the long-range wireless communication circuit.

According to an embodiment of the present disclosure, the second user identification information may include contact information corresponding to the external electronic device.

According to an embodiment of the present disclosure, the electronic device may further include a display, and the instructions, when executed, cause the processor to display a visual item representing the second user identification information through the display, receive a user input for the visual item, and transmit content data corresponding to the trigger event, to the external electronic device through the secure communication channel using the short-range wireless communication circuit, in response to the user input.

According to an embodiment of the present disclosure, the instructions, when executed, may cause the processor to acquire a shared key shared with the external electronic device, encrypt the first certificate data based on the shared key, and generate the advertisement packet including the encrypted first certificate data.

As described above, an electronic device disclosed herein may include a memory configured to store first certificate data of the electronic device, first user identification information on an external electronic device, and second certificate data corresponding to the first user identification information, a short-range wireless communication circuit, and a processor operatively connected to the memory and the short-range wireless communication circuit, and the memory may store instructions that, when executed, cause the processor to receive an advertisement packet including third certificate data through the short-range wireless communication circuit, compare the third certificate data with the second certificate data in response to receiving the advertisement packet, transmit a response packet generated based on the first certificate data to the external electronic device through the short-range wireless communication circuit, if the third certificate data and the second certificate data are matched, and establish a secure communication channel with the external electronic device based on a response of the external electronic device to the transmitted response packet, through the short-range wireless communication circuit.

As described above, an electronic device disclosed herein may include a memory configured to store first certificate data of the electronic device and second certificate data of an external electronic device, a short-range wireless communication circuit, a long-range wireless communication circuit, and a processor operatively connected to the memory, the short-range wireless communication circuit, and the long-range communication circuit, and the memory may store instructions that, when executed, cause the processor to log in to an external server based on a user account through the long-range wireless communication circuit, receive an account key value corresponding to the user account from the external server through the long-range wireless communication circuit, detect a trigger event for executing an operation of establishing a communication connection with a device around the electronic device, control the short-range wireless communication circuit to broadcast a message including the account key value, in response to detection of the trigger event, identify the external electronic device having the same key value as the account key value based on the message, transmit the first certificate data to the external electronic device through the short-range wireless communication circuit, receive third certificate data from the external electronic device through the short-range wireless communication circuit, and authenticate the external electronic device based on the second certificate data and the third certificate data.

According to an embodiment of the present disclosure, the instructions, when executed, may cause the processor to modulate the message using a bloom filter, and control the short-range wireless communication circuit to broadcast the modulated message.

According to an embodiment of the present disclosure, the instructions, when executed, may cause the processor to transmit user-specific information capable of identifying a user to the external server through the long-range wireless communication circuit, and receive, from the external server, the account key value generated based on the user-specific information, through the long-range wireless communication circuit.

According to an embodiment of the present disclosure, the instructions, when executed, may cause the processor to register the first certificate data in the external server based on the user account, through the long-range wireless communication circuit.

According to an embodiment of the present disclosure, the instructions, when executed, may cause the processor to receive, from the external server, the second certificate data registered in the external server based on the user account, through the long-range wireless communication circuit.

As described above, an electronic device disclosed herein may include a memory configured to store first certificate data of the electronic device and second certificate data of an external electronic device, a short-range wireless communication circuit, a long-range wireless communication circuit, and a processor operatively connected to the memory, the short-range wireless communication circuit, and the long-range communication circuit, and the memory may store instructions that, when executed, cause the processor to log in to an external server based on a user account through the long-range wireless communication circuit, receive an account key value corresponding to the user account from the external server through the long-range wireless communication circuit, receive a message including the account key value through the short-range wireless communication circuit, identify the external electronic device having the same key value as the account key value based on the message, receive third certificate data from the external electronic device through the short-range wireless communication circuit, authenticate the external electronic device based on the second certificate data and the third certificate data, and transmit the first certificate data to the external electronic device through the short-range wireless communication circuit, if authentication of the external electronic device is completed.

As described above, a method for communicating with an external electronic device by an electronic device, which is disclosed herein, may include storing first certificate data of the electronic device and second certificate data of the external electronic device, detecting a trigger event for establishing a communication connection with a device around the electronic device, broadcasting an advertisement packet generated based on the first certificate data, in response to detection of the trigger event, acquiring third certificate data from a response packet, if the response packet is received from the external electronic device in response to the advertisement packet, authenticating the external electronic device based on the second certificate data and the third certificate data, and establishing a secure communication channel with the external electronic device if the external electronic device is authenticated.

According to an embodiment of the present disclosure, the method may further include logging in to an external server by the electronic device based on a user account, transmitting second user identification information on the external electronic device to the external server, and receiving, from the external server, the second certificate data corresponding to the second user identification information in response to the second user identification information.

As described above, a method for communicating with an external electronic device by an electronic device, which is disclosed herein, may include storing first certificate data of the electronic device and second certificate data of the external electronic device, receiving an advertisement packet including third certificate data, comparing the third certificate data with the second certificate data in response to receiving the advertisement packet, transmitting a response packet generated based on the first certificate data to an external electronic device, if the third certificate data and the second certificate data are matched, and establishing a secure communication channel with the external electronic device based on the response of the external electronic device to the transmitted response packet.

As described above, a method for communicating with an external electronic device by an electronic device, which is disclosed herein, may include storing first certificate data of the electronic device and second certificate data of the external electronic device, logging in to an external server based on a user account, receiving an account key value corresponding to the user account from the external server, detecting a trigger event for establishing a communication connection with a device around the electronic device, broadcasting a message including the account key value, in response to detection of the trigger event, identifying the external electronic device having the same key value as the account key value based on the message, transmitting the first certificate data to the external electronic device, receiving third certificate data from the external electronic device, and authenticating the external electronic device based on the second certificate data and the third certificate data.

According to an embodiment of the present disclosure, the method may further include receiving, from the external server, the second certificate data registered in the external server based on the user account.

As described above, a method for communicating with an external electronic device by an electronic device, which is disclosed herein may include storing first certificate data of the electronic device and second certificate data of the external electronic device, logging in to an external server based on a user account, receiving an account key value corresponding to the user account from the external server, receiving a message including the account key value through the short-range wireless communication circuit, identifying the external electronic device having the same key value as the account key value based on the message, receiving third certificate data from the external electronic device, authenticating the external electronic device based on the second certificate data and the third certificate data, and transmitting the first certificate data to the external electronic device, if authentication of the external electronic device is completed.

According to the embodiments disclosed in the present disclosure, an electronic device and an external electronic device may communicate with each other without the need for a user or users of the electronic device and the external electronic device to manually configure settings for wireless communication between the electronic device and the external electronic device.

According to the embodiments disclosed in the present disclosure, since the electronic device and the external electronic device perform mutual authentication using certificates of the electronic device registered for a user account and the external electronic device, trusted devices may securely establish communication connection with each other.

According to the embodiments disclosed in the present document, the electronic device may establish communication connection with the external electronic device of another user related to the user of the electronic device by using contact information registered for the electronic device.

According to the embodiments disclosed in the present disclosure, since information that is capable of identifying the external electronic device may be provided to the user by using the contact information registered for the electronic device, the user of the electronic device may easily identify the user of the external electronic device connected to the electronic device.

Besides, various effects may be provided that are directly or indirectly identified through the present disclosure.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device, comprising:
    a memory;
    a short-range wireless communication circuit; and
    a processor operatively connected to the memory and the short-range wireless communication circuit, wherein the memory stores instructions that, when executed, cause the processor to:

retrieve, from an external server, a certificate list indicating a list of trusted devices for a single user account, wherein the certificate list is also received by an external electronic device, and includes first certificate data of the electronic device, and second certificate data of the external electronic device, detect a trigger event for requesting establishment a communication connection with a device local to the electronic device, control the short-range wireless communication circuit to broadcast an advertisement packet generated based on the first certificate data, in response to detecting the trigger event, after determining, by the external electronic device, that the first certificate data is indicated in the certificate list, receive a response packet from the external electronic device and acquire a third certificate data from the received response packet, authenticate the external electronic device based on detecting a match between the second certificate data for the external electronic device indicated in the certificate list and the third certificate data, and establish a secure communication channel with the external electronic device if the external electronic device is authenticated.

2. The electronic device of claim 1, wherein the instructions, when executed, further cause the processor to:

acquire a first hash value from the first certificate data using a hash function, wherein the generated advertisement packet includes the first hash value, wherein the third certificate data includes a second hash value, and wherein authenticating the external electronic device includes comparing the second hash value of the third certificate data with a hash value generated from the second certificate data.

3. The electronic device of claim 1, further comprising a long-range wireless communication circuit configured to communicate with the external server, wherein the instructions, when executed, further cause the processor to:

log in to the external server based on the single user account, wherein the external electronic device is also logged into the server via the single user account, and register a first user identification information stored on the electronic device and the first certificate data in the external server, through the long-range wireless communication circuit, and wherein the certificate list is generated by the external server based on transmission of user information to the external server by the electronic device and the external electronic device, and is accessed by the electronic device and the external electronic device by log in via the single user account.

4. The electronic device of claim 3, wherein the instructions, when executed, further cause the processor to:

transmit second user identification information stored in the memory to the external server, to which the electronic device is logged in based on the user account, through the long-range wireless communication circuit, and receive, from the external server, the second certificate data corresponding to the second user identification information, through the long-range wireless communication circuit.

5. The electronic device of claim 4, wherein the second user identification information includes contact information corresponding to the external electronic device.

6. The electronic device of claim 4, further comprising a display, wherein the instructions, when executed, further cause the processor to:

display an item representing the second user identification information, and in response to receiving a user input selecting the item, transmit content data corresponding to the detected trigger event to the external electronic device through the secure communication channel using the short-range wireless communication circuit.

7. The electronic device of claim 1, wherein the instructions, when executed, further cause the processor to:

acquire a shared key that is shared with the external electronic device, and encrypt the first certificate data based on the shared key, wherein the generated advertisement packet includes the encrypted first certificate data.

8. The electronic device of claim 3, wherein the instructions, when executed, further cause the processor to:

download the certificate list from the external server.

9. A method of an electronic device, the method comprising:

retrieving, from an external server, a certificate list indicating a list of trusted devices for a single user account, wherein the certificate list is also received by an external electronic device, and includes first certificate data of the electronic device, and second certificate data of the external electronic device, detecting a trigger event requesting establishment of a communication connection with another device local to the electronic device;

broadcasting an advertisement packet generated based on the first certificate data, in response to detection of the trigger event;

after determining, by the external electronic device, that the first certificate data is indicated in the certificate list, receiving a response packet from the external electronic device and acquiring third certificate data from the response packet received responsive to the broadcast advertisement packet, authenticating the external electronic device based on detecting a match between the second certificate data for the external electronic device indicated in the certificate list and the third certificate data; and establishing a secure communication channel with the external electronic device based on detecting that the external electronic device is authenticated.

10. The method of claim 9, further comprising:

acquiring a first hash value from the first certificate data using a hash function, wherein the generated advertisement packet includes the first hash value, wherein the third certificate data includes a second hash value, and wherein authenticating the external electronic device comprises comparing the second hash value of the third certificate data with a hash value generated from the second certificate data.

11. The method of claim 9, further comprising:

logging in to the external server based on a single user account, wherein the external electronic device is also logged into the server via the single user account; and registering a first user identification information stored on the electronic device and the first certificate data in the external server, wherein the certificate list is generated by the external server based on transmission of user information to the external server by the electronic device and the external electronic device, and is accessed by the electronic device and the external electronic device by log in via the single user account.

12. The method of claim 11, further comprising:

transmitting second user identification information stored in a memory to the external server; and receiving, from the external server, the second certificate data corresponding to the second user identification information.

13. The method of claim 12, wherein the second user identification information includes contact information corresponding to the external electronic device.

14. The method of claim 12, further comprising:

displaying an item representing the second user identification information;

receiving a user input selecting the item; and transmitting content data corresponding to the detected trigger event to the external electronic device through the secure communication channel.

15. The method of claim 9, further comprising:

acquiring a shared key that is shared with the external electronic device; and encrypting the first certificate data based on the shared key, wherein the generated advertisement packet includes the encrypted first certificate data.

16. An electronic device, comprising:

a memory configured to store first certificate data of the electronic device, and second certificate data of an external electronic device;

a short-range wireless communication circuit;

a long-range wireless communication circuit; and a processor operatively connected to the memory, the short-range wireless communication circuit, and the long-range communication circuit, wherein the memory stores instructions that, when executed, cause the processor to:

log in to an external server using a user account through the long-range wireless communication circuit, receive an account key value corresponding to the user account from the external server through the long-range wireless communication circuit, detect a trigger event for requesting establishment of a communication connection with a device local to the electronic device, control the short-range wireless communication circuit to broadcast a message including the received account key value, in response to detecting the trigger event, wherein an external electronic device determines possession of a key value matching the account key value, based on the message, transmit the first certificate data to the external electronic device through the short-range wireless communication circuit, receive third certificate data from the external electronic device through the short-range wireless communication circuit, authenticate the external electronic device based on the second certificate data and the third certificate data, modulate the message using a bloom filter, and control the short-range wireless communication circuit to broadcast the modulated message.

17. The electronic device of claim 16, wherein the instructions, when executed, further cause the processor to:

transmit user-specific information that identifies a user to the external server through the long-range wireless communication circuit, and wherein the account key value received from the external server is generated based on the user-specific information.

18. The electronic device of claim 16, wherein the instructions, when executed, further cause the processor to:

register the first certificate data in the external server based on the user account, through the long-range wireless communication circuit.

19. The electronic device of claim 16, wherein the second certificate data registered in the external server based on the user account is received from the external server through the long-range wireless communication circuit.

* * * * *